(12) United States Patent
Chen

(10) Patent No.: US 10,739,975 B2
(45) Date of Patent: Aug. 11, 2020

(54) COMPUTER IMPLEMENTED METHOD, CLIENT COMPUTING DEVICE AND COMPUTER READABLE STORAGE MEDIUM FOR DATA PRESENTATION

(71) Applicant: CANA TECHNOLOGIES PTY LTD, NSW (AU)

(72) Inventor: Hwai Bor Chen, New South Wales (AU)

(73) Assignee: CANA TECHNOLOGIES PTY LTD., New South Wales (AU)

( * ) Notice: Subject to any disclaimer, the term of this patent is extended or adjusted under 35 U.S.C. 154(b) by 0 days.

(21) Appl. No.: 15/736,755

(22) PCT Filed: Jun. 15, 2016

(86) PCT No.: PCT/AU2016/000205
§ 371 (c)(1),
(2) Date: Dec. 14, 2017

(87) PCT Pub. No.: WO2016/201485
PCT Pub. Date: Dec. 22, 2016

(65) Prior Publication Data
US 2018/0173410 A1    Jun. 21, 2018

(30) Foreign Application Priority Data

Jun. 15, 2015 (AU) ................................ 2015902253
Jun. 15, 2015 (AU) ................................ 2015902258

(51) Int. Cl.
*G06F 3/0484* (2013.01)
*G01C 21/36* (2006.01)
*G06F 3/0488* (2013.01)
*G06T 11/00* (2006.01)

(52) U.S. Cl.
CPC ..... *G06F 3/04847* (2013.01); *G01C 21/3682* (2013.01); *G06F 3/04845* (2013.01); *G06F 3/04883* (2013.01); *G06T 11/001* (2013.01); *G06F 2203/04808* (2013.01); *G06T 2200/24* (2013.01)

(58) Field of Classification Search
CPC .................................................... G06F 3/0484
USPC .......................................................... 715/771
See application file for complete search history.

(56) References Cited

U.S. PATENT DOCUMENTS

| 8,806,361 | B1 * | 8/2014 | Noel ..................... G06F 3/0484 715/771 |
| 9,467,515 | B1 * | 10/2016 | Penilla ................... G06Q 20/18 |
| 2012/0303274 | A1 * | 11/2012 | Su ....................... G01C 21/3632 701/533 |
| 2013/0143657 | A1 * | 6/2013 | Overton ................ G06F 3/0485 463/37 |

(Continued)

*Primary Examiner* — William D Titcomb
(74) *Attorney, Agent, or Firm* — WPAT, P.C.; Anthony King

(57) ABSTRACT

The disclosure relates to a computing device and method involving receiving map data representing a map; receiving event artifact data representing at least one event artifact, the event artifact data representing an event time and an event location; receiving time selection data representing a time selection; and rendering the map representation in accordance with the map data, event artifact data and the time selection data. The disclosure also relates to a computing device and method for providing a controllable time period display.

6 Claims, 18 Drawing Sheets

(56) References Cited

U.S. PATENT DOCUMENTS

| | | | |
|---|---|---|---|
| 2013/0212521 A1* | 8/2013 | Fedoseyeva | G06Q 10/00 715/781 |
| 2013/0321456 A1* | 12/2013 | Hultquist | G01C 21/3667 345/629 |
| 2013/0328862 A1* | 12/2013 | Piemonte | G06T 15/00 345/419 |
| 2016/0018974 A1* | 1/2016 | Welton | G06F 3/04847 715/753 |
| 2016/0210270 A1* | 7/2016 | Kelly | G06Q 10/10 |

* cited by examiner

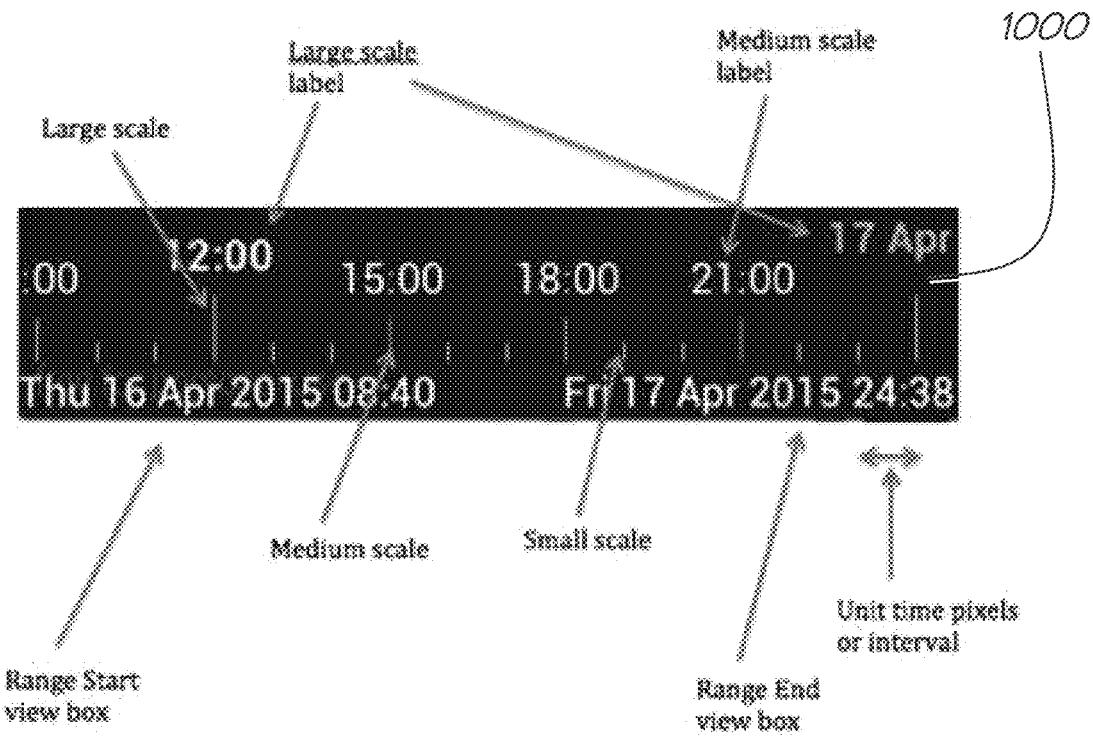

| Small Scale | Scale marking of smallest height |
|---|---|
| Medium Scale | Scale marking of medium height |
| Large Scale | Scale marking of tallest height |
| Medium Scale Label | Labels describing some of the medium scales |
| Large Scale Label | Labels describing some of the large scales |
| Range Start view box | View box showing the start time of the selected time range |
| Range End view box | View box showing the end time of the selected time range |
| Unit time pixels | The number of pixels between two adjacent scales. |
| Unit time interval | The actual time interval which corresponds to a unit time pixels. |

Figure 10

COMPUTER IMPLEMENTED METHOD, CLIENT COMPUTING DEVICE AND COMPUTER READABLE STORAGE MEDIUM FOR DATA PRESENTATION

FIELD OF THE INVENTION

The present invention relates to rendering of maps and in particular to a computer implemented method, client computing device and computer readable storage medium for rendering a map representation.

Particular arrangements of the invention disclosed herein have been developed for use in applications such as real estate software applications, for example, and will be described hereinafter with reference to this application. Further arrangements of the invention disclosed herein have been developed for use in applications which employ the rendering of map representations which change in accordance with time, for example so-called 4D maps.

However, it will be appreciated that the invention is not limited to these particular fields of use.

SUMMARY OF THE INVENTION

The invention seeks to provide a computer implemented method, client computing device and computer readable storage medium for rendering a map representation which will overcome or substantially ameliorate at least some of the deficiencies of the prior art, or to at least provide a useful alternative.

According to a first aspect of the present invention there is provided a computer implemented method for rendering a map representation. The method may comprise the step of receiving map data representing a map. The method may further comprise the step of receiving event artefact data representing at least one event artifact, the event artefact data representing an event time and an event location. The method may further comprise the step of receiving time selection data representing a time selection. The method may further comprise the step of rendering the map representation in accordance with the map data, event artefact data and the time selection data.

According to a particular arrangement of the first aspect, there is provided a computer implemented method for rendering a map representation, the method comprising receiving map data representing a map; receiving event artefact data representing at least one event artifact, the event artefact data representing an event time and an event location; receiving time selection data representing a time selection; and rendering the map representation in accordance with the map data, event artefact data and the time selection data.

The event time may represent a time.

Rendering the map representation may comprise rendering a representation of the at least one event artefact should the time and the time selection be proximate in time.

The computer implemented method may further comprise the step of calculating whether the time selection and a time are proximate in time. Calculating whether the time selection and the time proximate in time may comprise calculating whether the time occurs within a threshold time period of the time selection.

The event time may represent a time period.

The time selection data may represent a start time and an end time.

Rendering the map representation may comprise rendering a representation of the at least one event artefact should the time and a time period coincided.

The computer implemented method may further comprise the step of receiving further time selection data representing a further time selection and rendering the map representation further in accordance with the further time selection data.

Receiving the time selection data may comprise displaying a time selection control and receiving from the time selection control the time selection.

Rendering the map representation may comprise rendering the time selection control.

Receiving the time selection data may comprise receiving a gesture.

The map interaction gesture may comprise at least one of pan and zoom gestures.

The computer implemented method may further comprise caching the event artefact data.

Caching the event artefact data may comprise selecting the event artefact data for caching.

Selecting the event artefact data for caching may comprise receiving region selection data representing a region selection; and selecting the event artefact data at least in accordance with the region selection data.

The computer implemented method may further comprise selecting the event artefact data for caching further in accordance with a bounding region.

The computer implemented method may further comprise selecting the event artefact data for caching further in accordance with a route calculation.

The method may further comprise rendering the map representation further in accordance with the event attribute data.

The at least one event artefact may comprise two event artifacts

Rendering the map representation may further comprise representing only one of the two event artifacts in accordance with the time selection data.

Rendering the map representation may further comprise representing the two event artifacts in a representation representative of each respective event time.

The representation may comprise a representation in differing colours.

According to a second aspect of the present invention, there is provided a client computing device for rendering a map representation. The computing device may comprise a processor for processing digital data. The computing device may further comprise a memory device for storing digital data including computer program code, the memory device being operably coupled to the processor. The computing device may further comprise a user interface adapted for receiving user input data, the user interface being operably coupled to the processor. The computing device may further comprise a display device for displaying digital data, the display device being operably coupled to the processor. The computing device may further comprise a network interface adapted for sending and receiving data across a data network, the network interface being operably coupled to the processor In use, the processor may be controlled by the computer program code to receive, via the network interface, map data representing a map. The processor may further be controlled by the computer program code to receive, via the network interface, event artefact data representing at least one event artifact. The event artefact data may represent an event time and an event location. The processor may further be controlled by the computer program code to receive, via the user interface, time selection data representing a time selection. The processor may further be controlled by the computer program code to render, using the display device, the map representation in accordance with the map data, event artefact data and the time selection data.

According to a particular arrangement of the second aspect, there is provided a client computing device for rendering a map representation, the computing device comprising a processor for processing digital data; a memory device for storing digital data including computer program code, the memory device being operably coupled to the processor; a user interface adapted for receiving user input data, the user interface being operably coupled to the processor; a display device for displaying digital data, the display device being operably coupled to the processor; and a network interface adapted for sending and receiving data across a data network, the network interface being operably coupled to the processor, wherein, in use, the processor is controlled by the computer program code to receive, via the network interface, map data representing a map; receive, via the network interface, event artefact data representing at least one event artifact, the event artefact data representing an event time and an event location; receive, via the user interface, time selection data representing a time selection; and render, using the display device, the map representation in accordance with the map data, event artefact data and the time selection data.

The event time may represent a time.

In rendering the map representation, the processor may be further controlled by the computer program code to render, using the display device, a representation of the at least one event artefact should the time and the time selection be proximate in time.

The processor may be further controlled by the computer program code to calculate whether the time selection and a time are proximate in time.

In calculating whether the time selection at the time proximate in time, the processor may be further controlled by the computer program code to calculate whether the time occurs within a threshold time period of the time selection.

The event time may represent a time period.

The time selection data may represent a start time and an end time.

In rendering the map representation, the processor may be further controlled by the computer program code to render, using the display device, a representation of the at least one event artefact should the time and a time period coincided.

The processor may be further controlled by the computer program code to receive, via the user interface, further time selection data representing a further time selection and rendering the map representation further in accordance with the further time selection data.

In receiving the time selection data, the processor may be further controlled by the computer program code to display, using the display device, a time selection control and receive, via the user interface, from the time selection control the time selection.

In rendering the map representation, the processor may be further controlled by the computer program code to render, using the display device, the time selection control.

In receiving the time selection data, the processor may be further controlled by the computer program code to receive, using the user interface, a gesture.

The map interaction gesture may comprise at least one of pan and zoom gestures.

The processor may be further controlled by the computer program code to cache, using the memory device, the event artefact data.

may be n caching the event artefact data, the processor may be further controlled by the computer program code to select the event artefact data for caching.

In selecting the event artefact data for caching, the processor may be further controlled by the computer program code to receive, via the user interface, region selection data representing a region selection; and select, from the memory device, the event artefact data at least in accordance with the region selection data.

The processor may be further controlled by the computer program code to select, from the memory device, the event artefact data for caching further in accordance with a bounding region.

The processor may be further controlled by the computer program code to select the event artefact data for caching further in accordance with a route calculation.

The processor may be further controlled by the computer program code to render, using the display device, the map representation further in accordance with the event attribute data.

The at least one event artefact may comprise two event artifacts.

In rendering the map representation, the processor may be further controlled by the computer program code to represent, using the display device only one of the two event artifacts in accordance with the time selection data.

In rendering the map representation, the processor may be further controlled by the computer program code to represent, using the display device, the two event artifacts in a representation representative of each respective event time.

The representation may comprise a representation in differing colours.

According to a third aspect of the present invention, there is provided a computer readable storage medium for rendering a map representation. The computer readable storage medium may comprise computer code instructions thereupon executable by a computing device. The computer readable storage medium may comprise instructions for receiving map data representing a map. The computer readable storage medium may further comprise receiving event artefact data representing at least one event artifact. The event artefact data may represent an event time and an event location. The computer readable storage medium may further comprise receiving time selection data representing a time selection. The computer readable storage medium may further comprise rendering the map representation in accordance with the map data, event artefact data and the time selection data.

According to a particular arrangement of the third aspect, there is provided a computer readable storage medium for rendering a map representation, the computer readable storage medium comprising computer code instructions thereupon executable by a computing device, and comprising instructions for receiving map data representing a map; receiving event artefact data representing at least one event artifact, the event artefact data representing an event time and an event location; receiving time selection data representing a time selection; and rendering the map representation in accordance with the map data, event artefact data and the time selection data.

The event time may represent a time.

The instructions for rendering the map representation may further comprise instructions for rendering a representation of the at least one event artefact should the time and the time selection be proximate in time.

The computer readable storage medium may further comprise instructions for calculating whether the time selection and a time are proximate in time.

The instructions for calculating whether the time selection at the time proximate in time may further comprise instructions for calculating whether the time occurs within a threshold time period of the time selection.

The event time may represent a time period.

The time selection data may represent a start time and an end time.

The instructions for rendering the map representation may comprise instructions for rendering a representation of the at least one event artefact should the time and a time period coincided.

The computer readable storage medium may further comprise instructions for receiving further time selection data representing a further time selection and rendering the map representation further in accordance with the further time selection data.

The instructions for receiving the time selection data may comprise displaying a time selection control and receiving from the time selection control the time selection.

The instructions for rendering the map representation may comprise instructions for rendering the time selection control.

The instructions for receiving the time selection data may comprise instructions for receiving a gesture.

The map interaction gesture may comprise at least one of pan and zoom gestures.

The computer readable storage medium may further comprise instructions for caching the event artefact data.

The instructions for caching the event artefact data may comprise instructions for selecting the event artefact data for caching.

The instructions for selecting the event artefact data for caching may comprise instructions for receiving region selection data representing a region selection; and selecting the event artefact data at least in accordance with the region selection data.

The computer readable storage medium may further comprise instructions for selecting the event artefact data for caching further in accordance with a bounding region.

The computer readable storage medium may further comprise instructions for selecting the event artefact data for caching further in accordance with a route calculation.

The event artefact data may further comprise instructions for event attribute data representing an event attribute and may further comprise instructions for rendering the map representation further in accordance with the event attribute data.

The at least one event artefact may comprise two event artifacts.

Rendering the map representation may further comprise instructions for representing only one of the two event artifacts in accordance with the time selection data.

Rendering the map representation may further comprise instructions for representing the two event artifacts in a representation representative of each respective event time.

The representation may comprise a representation in differing colours.

According to a fourth aspect of the present invention, there is provided a computer implemented method for providing a controllable time period display. The method may comprise the step of displaying a time period on a graphical user interface. The time period may be displayed in the form of a visual scale having evenly separated increments displayed from a first end of the display to an opposite second end of the display. The first end of the display may represent a start time for the time period. The second end of the display may represent an end time for the time period, the start time and end time defining a duration of the displayed time period. At least some of the increments may be labelled with an associated respective time within the displayed time period. The method may further comprise the step of receiving and determining a user input to change the time period. The method may further comprise the step of displaying the changed time period in accordance with the determined user input.

If the determined user input is to change the start time for the time period without changing the duration of the time period, the method may further comprise the step of displaying the increments moving towards or away from the first end of the display while maintaining the even separation of the increments while moving.

If the determined user input is to change the duration of the displayed time period, the method may further comprise the step of displaying the increments as either separating or moving towards each other. The increments may be displayed as either separating or moving towards each other until the displayed separation between adjacent increments reaches either a predetermined maximum or minimum threshold. Upon reaching either the predetermined maximum or minimum threshold, the display of increments may be changed to a default separation between adjacent increments and least some of the increments may be relabeled with an associated respective time within the adjusted displayed time period.

According to a particular arrangement of the fourth aspect, there is provided a computer implemented method for providing a controllable time period display, the method comprising: displaying a time period on a graphical user interface, the time period is displayed in the form of a visual scale having evenly separated increments displayed from a first end of the display to an opposite second end of the display, wherein the first end of the display represents a start time for the time period and the second end of the display represents an end time for the time period, the start time and end time defining a duration of the displayed time period, wherein at least some of the increments are labelled with an associated respective time within the displayed time period; receiving and determining a user input to change the time period; displaying the changed time period in accordance with the determined user input; wherein, if the determined user input is to change the start time for the time period without changing the duration of the time period, displaying the increments moving towards or away from the first end of the display while maintaining the even separation of the increments while moving; wherein, if the determined user input is to change the duration of the displayed time period, displaying the increments as either separating or moving towards each other; wherein the increments are displayed as either separating or moving towards each other until the displayed separation between adjacent increments reaches either a predetermined maximum or minimum threshold, wherein, upon reaching either the predetermined maximum or minimum threshold, the display of increments is changed to a default separation between adjacent increments and least some of the increments are relabeled with an associated respective time within the adjusted displayed time period.

The graphical user interface may comprise a touchscreen device.

If the received user input is the movement of at least one finger across the touchscreen, the user input may be determined to be to change the start time for the time period without changing the duration of the time period. The direction in which the increments are displayed to be moving may correspond with the direction of the movement of the finger(s).

If the received user input is the movement of two fingers towards or away from each other on the touchscreen, the user input may be determined to be to change the duration of the displayed time period. The displayed increments may be caused to separate or move towards each other in accordance with the movement of the fingers.

The displayed increments may be either a major or a minor increment. Major increments may be displayed as larger compared with minor increments. In particular arrangements, only major increments may be labelled with an associated respective time within the displayed time period.

The instant start time and the instant end time of the displayed time period may be displayed separately from the visual scale.

According to a fifth aspect of the present invention, there is provided a client computing device for providing a controllable time period display. The computing device may comprise a processor for processing digital data. The computing device may further comprise a memory device for storing digital data including computer program code, the memory device being operably coupled to the processor. The computing device may further comprise a graphical user interface adapted for receiving user input data and displaying digital data, the user interface being operably coupled to the processor.

In use, the processor may be controlled by the computer program code to display a time period on the graphical user interface. The time period may be displayed in the form of a visual scale having evenly separated increments displayed from a first end of the display to an opposite second end of the display. The first end of the display may represent a start time for the time period and the second end of the display represents an end time for the time period, the start time and end time defining a duration of the displayed time period. At least some of the increments may be labelled with an associated respective time within the displayed time period. The processor may be further controlled by the computer program code to receive and determine a user input to change the time period. The processor may be further controlled by the computer program code to display the changed time period in accordance with the determined user input. If the determined user input is to change the start time for the time period without changing the duration of the time period, the processor may be further controlled by the computer program code to display the increments moving towards or away from the first end of the display while maintaining the even separation of the increments while moving. If the determined user input is to change the duration of the displayed time period, the processor may be further controlled by the computer program code to display the increments as either separating or moving towards each other. The increments may be displayed as either separating or moving towards each other until the displayed separation between adjacent increments reaches either a predetermined maximum or minimum threshold. Upon reaching either the predetermined maximum or minimum threshold, the display of increments may be changed to a default separation between adjacent increments and least some of the increments are relabeled with an associated respective time within the adjusted displayed time period.

According to a particular arrangement of the fifth aspect, there is provided a client computing device for providing a controllable time period display, the computing device comprising: a processor for processing digital data; a memory device for storing digital data including computer program code, the memory device being operably coupled to the processor; a graphical user interface adapted for receiving user input data and displaying digital data, the user interface being operably coupled to the processor; and wherein, in use, the processor is controlled by the computer program code to: display a time period on the graphical user interface, the time period is displayed in the form of a visual scale having evenly separated increments displayed from a first end of the display to an opposite second end of the display, wherein the first end of the display represents a start time for the time period and the second end of the display represents an end time for the time period, the start time and end time defining a duration of the displayed time period, wherein at least some of the increments are labelled with an associated respective time within the displayed time period; receive and determine a user input to change the time period; display the changed time period in accordance with the determined user input; wherein, if the determined user input is to change the start time for the time period without changing the duration of the time period, displaying the increments moving towards or away from the first end of the display while maintaining the even separation of the increments while moving; wherein, if the determined user input is to change the duration of the displayed time period, displaying the increments as either separating or moving towards each other; wherein the increments are displayed as either separating or moving towards each other until the displayed separation between adjacent increments reaches either a predetermined maximum or minimum threshold, wherein, upon reaching either the predetermined maximum or minimum threshold, the display of increments is changed to a default separation between adjacent increments and least some of the increments are relabeled with an associated respective time within the adjusted displayed time period.

The graphical user interface may be a touchscreen device.

If the received user input is the movement of at least one finger across the touchscreen, the user input may be determined to be to change the start time for the time period without changing the duration of the time period. The direction in which the increments are displayed to be moving may correspond with the direction of the movement of the finger(s).

If the received user input is the movement of two fingers towards or away from each other on the touchscreen, the user input may be determined to be to change the duration of the displayed time period; wherein the displayed increments are caused to separate or move towards each other in accordance with the movement of the fingers.

Displayed increments may be either a major or a minor increment. Major increments may be displayed as larger compared with minor increments. In particular arrangements, only major increments may be labelled with an associated respective time within the displayed time period.

The instant start time and the instant end time of the displayed time period may be displayed separately from the visual scale.

According to a sixth aspect of the present invention, there is provided a computer readable storage medium for providing a controllable time period display. The computer readable storage medium may comprise computer code instructions thereupon executable by a computing device. The computer readable storage medium may comprise computer code instructions for displaying a time period on a graphical user interface. The time period may be displayed in the form of a visual scale having evenly separated increments displayed from a first end of the display to an opposite second end of the display. The first end of the display may represent a start time for the time period. The second end of the display may represent an end time for the time period, the start time and end time defining a duration of the displayed time period. At least some of the increments may be labelled with an associated respective time within the displayed time period. The computer readable storage medium may further comprise computer code instructions for receiving and determining a user input to change the time period. The computer readable storage medium may further comprise computer code instructions for displaying the changed time period in accordance with the determined user input. If the determined user input is to change the start time for the time period without changing the duration of the time period, the computer readable storage medium may further comprise computer code instructions for displaying the increments moving towards or away from the first end of the display while maintaining the even separation of the increments while moving. If the determined user input is to change the duration of the displayed time period, the computer readable storage medium may further comprise computer code instructions for displaying the increments as either separating or moving towards each other The increments may be displayed as either separating or moving towards each other until the displayed separation between adjacent increments reaches either a predetermined maximum or minimum threshold, wherein, upon reaching either the predetermined maximum or minimum threshold, the display of increments may be changed to a default separation between adjacent increments and least some of the increments are relabeled with an associated respective time within the adjusted displayed time period.

According to a particular arrangement of the sixth aspect, there is provided a computer readable storage medium for providing a controllable time period display, the computer readable storage medium comprising computer code instructions thereupon executable by a computing device, and comprising instructions for: displaying a time period on a graphical user interface, the time period is displayed in the form of a visual scale having evenly separated increments displayed from a first end of the display to an opposite second end of the display, wherein the first end of the display represents a start time for the time period and the second end of the display represents an end time for the time period, the start time and end time defining a duration of the displayed time period, wherein at least some of the increments are labelled with an associated respective time within the displayed time period; receiving and determining a user input to change the time period; displaying the changed time period in accordance with the determined user input; wherein, if the determined user input is to change the start time for the time period without changing the duration of the time period, displaying the increments moving towards or away from the first end of the display while maintaining the even separation of the increments while moving; wherein, if the determined user input is to change the duration of the displayed time period, displaying the increments as either separating or moving towards each other; wherein the increments are displayed as either separating or moving towards each other until the displayed separation between adjacent increments reaches either a predetermined maximum or minimum threshold, wherein, upon reaching either the predetermined maximum or minimum threshold, the display of increments is changed to a default separation between adjacent increments and least some of the increments are relabeled with an associated respective time within the adjusted displayed time period.

The graphical user interface may be a touchscreen device.

If the received user input is the movement of at least one finger across the touchscreen, the user input may be determined to be to change the start time for the time period without changing the duration of the time period. The direction in which the increments are displayed to be moving may correspond with the direction of the movement of the finger(s).

If the received user input is the movement of two fingers towards or away from each other on the touchscreen, the user input may be determined to be to change the duration of the displayed time period. The displayed increments may be caused to separate or move towards each other in accordance with the movement of the fingers.

Displayed increments may be either a major or a minor increment. Major increments may be displayed as larger compared with minor increments. In particular arrangements, only major increments may be labelled with an associated respective time within the displayed time period.

The instant start time and the instant end time of the displayed time period may be displayed separately from the visual scale.

Other aspects of the invention are also disclosed.

BRIEF DESCRIPTION OF THE DRAWINGS

Notwithstanding any other forms which may fall within the scope of the present invention, preferred arrangements of the invention will now be described, by way of example only, with reference to the accompanying drawings in which:

FIG. 10 shows a time period controller according to a preferred arrangement of the present invention displayed on a touchscreen display;

DETAILED DESCRIPTION

Figure 1:
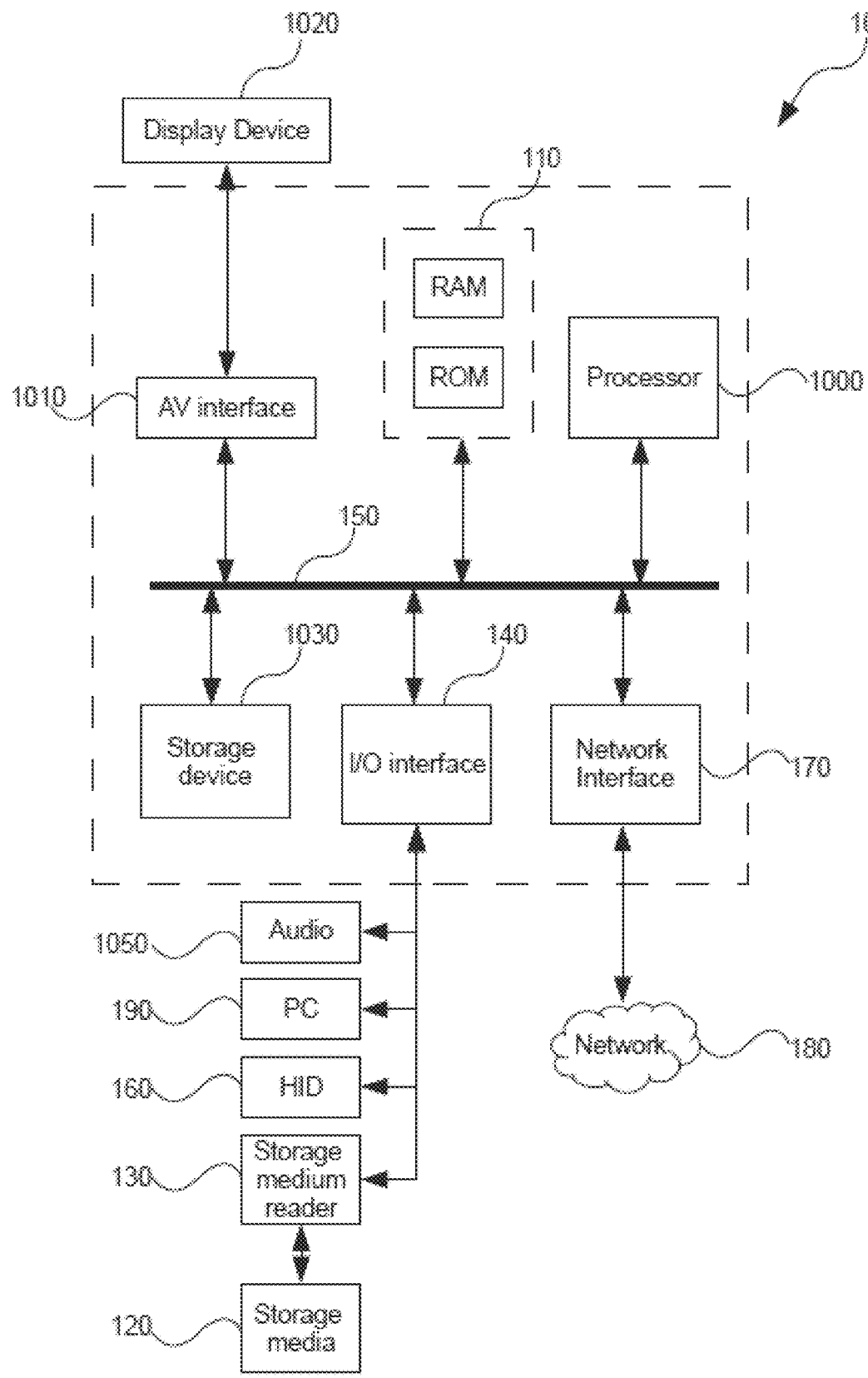
FIG. 1 shows a computing device on which the various arrangements described herein may be implemented in accordance with an arrangement of the present invention.

It should be noted in the following description that like or the same reference numerals in different arrangements denote the same or similar features.

Computing Device 100

FIG. 1 shows a computing device 100 on which the various arrangements described herein may be implemented. As will become apparent from the description below, the computing device 100 is adapted for rendering a map representation 310 as substantially shown in FIG. 3 or for providing a controllable time period display as disclosed herein as substantially shown in FIG. 10. Furthermore, the computing device 100 may take on differing arrangements depending on the application, including those shown in FIG. 2, including the computing device 100 taking the form of a Data server 210, client computing device 220 and the like.

In the ensuing description, in one particular arrangement, the computing device 100 is employed for use by users in displaying their map representation wherein the map representation comprises a plurality of event artifacts representing an event time and event location. In a further arrangement, the computing device 100 is employed for use by users in displaying and controlling a time period Furthermore, in an arrangement, the steps of the method of rendering their map representation may be implemented as computer program code instructions executable by the computing device 100. Furthermore, in a further arrangement, the steps of the method of providing a controllable time period display may be implemented as computer program code instructions executable by the computing device 100.

The computer program code instructions may be divided into one or more computer program code instruction libraries, such as dynamic link libraries (DLL), wherein each of the libraries performs a one or more steps of the method. Additionally, a subset of the one or more of the libraries may perform graphical user interface tasks relating to the steps of the method.

The device 100 comprises semiconductor memory 110 comprising volatile memory such as random access memory (RAM) or read only memory (ROM). The memory 100 may comprise either RAM or ROM or a combination of RAM and ROM.

The device 100 comprises a computer program code storage medium reader 130 for reading the computer program code instructions from computer program code storage media 120. The storage media 120 may be optical media such as CD-ROM disks, magnetic media such as floppy disks and tape cassettes or flash media such as USB memory sticks.

The device further comprises I/O interface 140 for communicating with one or more peripheral devices. The I/O interface 140 may offer both serial and parallel interface connectivity. For example, the I/O interface 140 may comprise a Small Computer System Interface (SCSI), Universal Serial Bus (USB) or similar I/O interface for interfacing with the storage medium reader 130. The I/O interface 140 may also communicate with one or more human input devices (HID) 160 such as keyboards, pointing devices, joysticks and the like. The I/O interface 140 may also comprise a computer to computer interface, such as a Recommended Standard 232 (RS-232) interface, for interfacing the device 100 with one or more personal computer (PC) devices 190. The I/O interface 140 may also comprise an audio interface for communicate audio signals to one or more audio devices 1050, such as a speaker or a buzzer.

The device 100 also comprises a network interface 170 for communicating with one or more computer networks 180. The network 180 may be a wired network, such as a wired Ethernet™ network or a wireless network, such as a Bluetooth™ network, IEEE 802.11 network or cellular network (e.g. a 3G or 4G telecommunications network). The network 180 may be a local area network (LAN), such as a home or office computer network, or a wide area network (WAN), such as the Internet or private WAN.

The device 100 comprises an arithmetic logic unit or processor 1000 for performing the computer program code instructions. The processor 1000 may be a reduced instruction set computer (RISC) or complex instruction set computer (CISC) processor or the like. The device 100 further comprises a storage device 1030, such as a magnetic disk hard drive or a solid state disk drive.

Computer program code instructions may be loaded into the storage device 1030 from the storage media 120 using the storage medium reader 130 or from the network 180 using network interface 170. During the bootstrap phase, an operating system and one or more software applications are loaded from the storage device 1030 into the memory 110. During the fetch-decode-execute cycle, the processor 1000 fetches computer program code instructions from memory 110, decodes the instructions into machine code, executes the instructions and stores one or more intermediate results in memory 100.

In this manner, the instructions stored in the memory 110, when retrieved and executed by the processor 1000, may configure the computing device 100 as a special-purpose machine that may perform the functions described herein.

The device 100 also comprises a video interface 1010 for conveying video signals to a display device 1020, such as a liquid crystal display (LCD), cathode-ray tube (CRT) or similar display device.

The device 100 also comprises a communication bus subsystem 150 for interconnecting the various devices described above. The bus subsystem 150 may offer parallel connectivity such as Industry Standard Architecture (ISA), conventional Peripheral Component Interconnect (PCI) and the like or serial connectivity such as PCI Express (PCIe), Serial Advanced Technology Attachment (Serial ATA) and the like.

In exemplary arrangements, the computing device is a smart phone or tablet device. Such devices have interactive graphical user interfaces in the form of touchscreen displays. In practice, touchscreen displays provide an optimum mechanism in which to employ the controllable time period display. Furthermore, popular devices which employ Android or iOS have standard widgets which can be utilized in implementing the controllable time period display.

| Widget | Description |
| --- | --- |
| GUI | Abbreviated for Graphical User Interface, which is a combination of hardware and software designed to present the running state of a system to the user and also accepts input from the user. |
| Scroller | An object in the GUI for defining a horizontal or vertical coordinate by clicking and dragging the control in the X or Y direction. In this case only the horizontal Scroller is used and the coordinate represents time. |
| Gesture Detector | A Gesture Detector analyses input via a multi-touch device (such as a track pad or a touch screen) to see if the user action has produced any of the scroll, fling, and down events. It then invokes the respective Event Listeners to handle the corresponding events. |
| Flinger | A software object called when the Gesture Detector detects a fling action from the user. This object is called to calculate and control the precise position and movement on the Scroller to simulate the effect of a fling action. |
| Event Listener | An event listener implements the logic of what to update when the Scroller is being moved. The Event Listeners may be called at the end of a user interaction or while in progress, depending on whether the transient updates are necessary and meaningful. |

It will be appreciated that the above represent example widgets for use in an exemplary embodiments and that the use of different, additional and/or alternative widgets can be employed in alternative embodiments.

System 200 for Rendering a Map Representation

Figure 2:
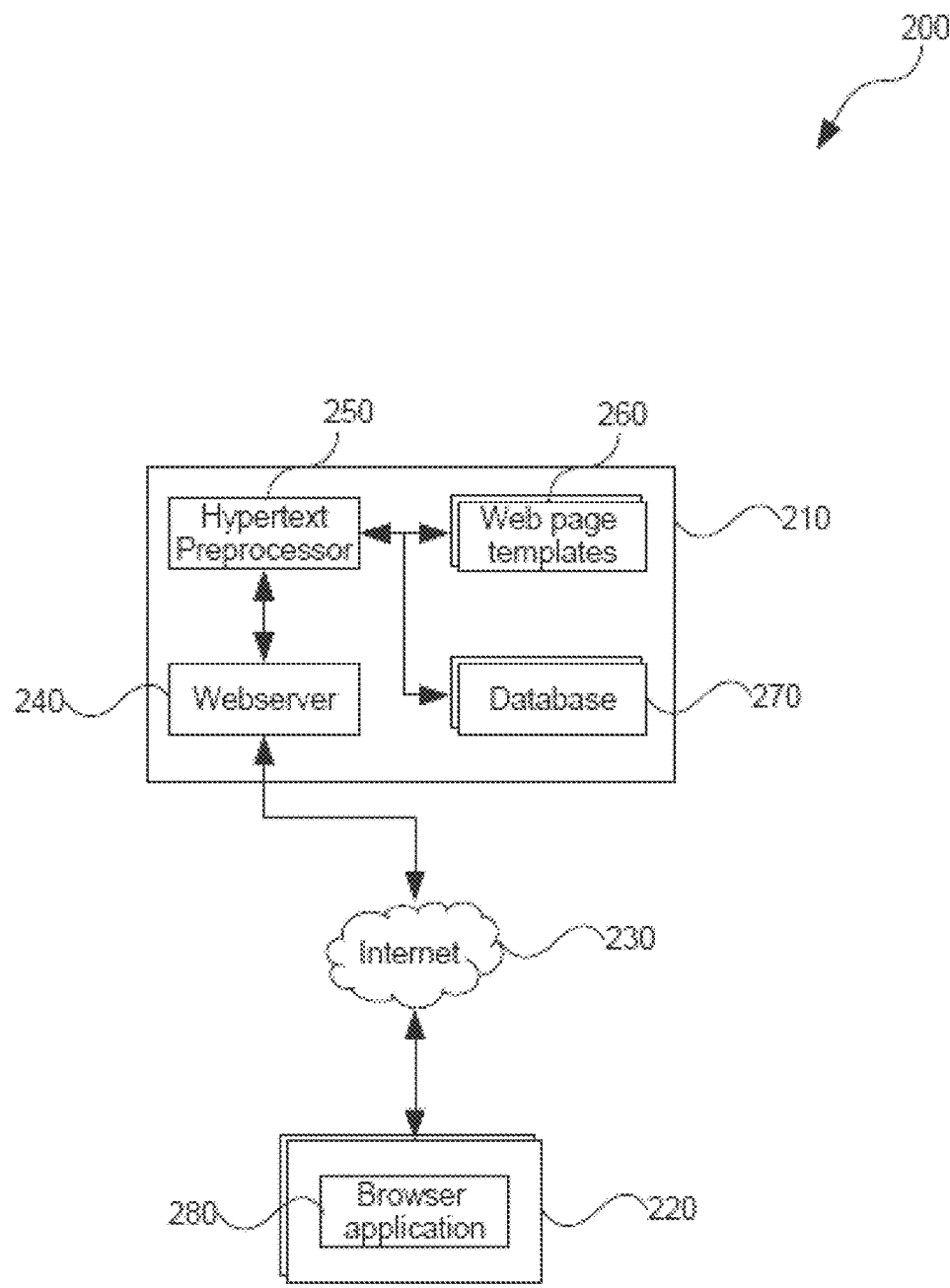
FIG. 2 shows a system of computing devices on which the various arrangements described herein may be implemented in accordance with an arrangement of the present invention.

FIG. 2 shows a system 200 of computing devices 100 on which the various arrangements described herein may be implemented. As is apparent, the system 200 is deployed as a web-server architecture. As such, the system 200 comprises a data server 210 for serving web pages to one or more client computing devices 220 over the Internet 230. However, it should be noted that while a web-server architecture is a preferred arrangement, the system 200 need not be deployed in such a manner and may be deployed across other data networks as the case may be. In a less preferred arrangement, the arrangement is described herein need not necessarily be implemented either across a communication network wherein, for example, the client computing device 220 stores within a database of the client computing device 220 the map data, event artifacts data and the like so as to be able to render the map representation without resorting to request data from across a data network.

The data server 210 is provided with a data server application 240 for receiving requests, such as Hypertext Transfer Protocol (HTTP) and File Transfer Protocol (FTP) requests, and serving hypertext web pages or files in response. The data server application 240 may be, for example the Apache™ or the Microsoft™ IIS HTTP server.

The data server 210 is also provided with a hypertext preprocessor 250 for processing one or more web page templates 260 and data from one or more databases 270 to generate hypertext web pages. The hypertext preprocessor may, for example, be the PHP: Hypertext Preprocessor (PHP) or Microsoft Asp™ hypertext preprocessor. The data server 210 is also provided with web page templates 260, such as one or more PHP or ASP files.

Upon receiving a request from the data server application 240, the hypertext preprocessor 250 is operable to retrieve a web page template, from the web page templates 260, execute any dynamic content therein, including updating or loading information from the one or more databases 270, to compose a hypertext web page. The composed hypertext web page may comprise client side code, such as Javascript, for Document Object Model (DOM) manipulating, asynchronous HTTP requests and the like.

Client computing devices 220 are provided with a browser application 280, such as the Mozilla Firefox™ or Microsoft Internet Explorer™ browser applications. The browser application 280 requests hypertext web pages from the data server 210 and renders the hypertext web pages on a display device 1020.

It should be noted that in certain arrangements, the client computing device 220 is adapted to receive content from multiple data servers 210 for combination and subsequent rendering by the browser application 280 of the client computing devices 220. For example, the map data may be obtained by the client computing device 220 from a first data server 220 and the event artifacts data may be retrieved from a second data server 220 wherein the browser 280 (or other software application) combines the event artifacts data and map data for rendering.

In one arrangement, the client computing device 220 is provided with a software application, such as a downloadable software application downloaded from the Apple iTunes, Google Play store or the like. In this manner, the software application is adapted for rendering the map representation in the manner described herein as opposed to the client computing device 220 receiving additional data or the like representing a map representation for rendering by the browser application 280.

Client Computing Device 220 Rendering a Map Representation

Figure 3:
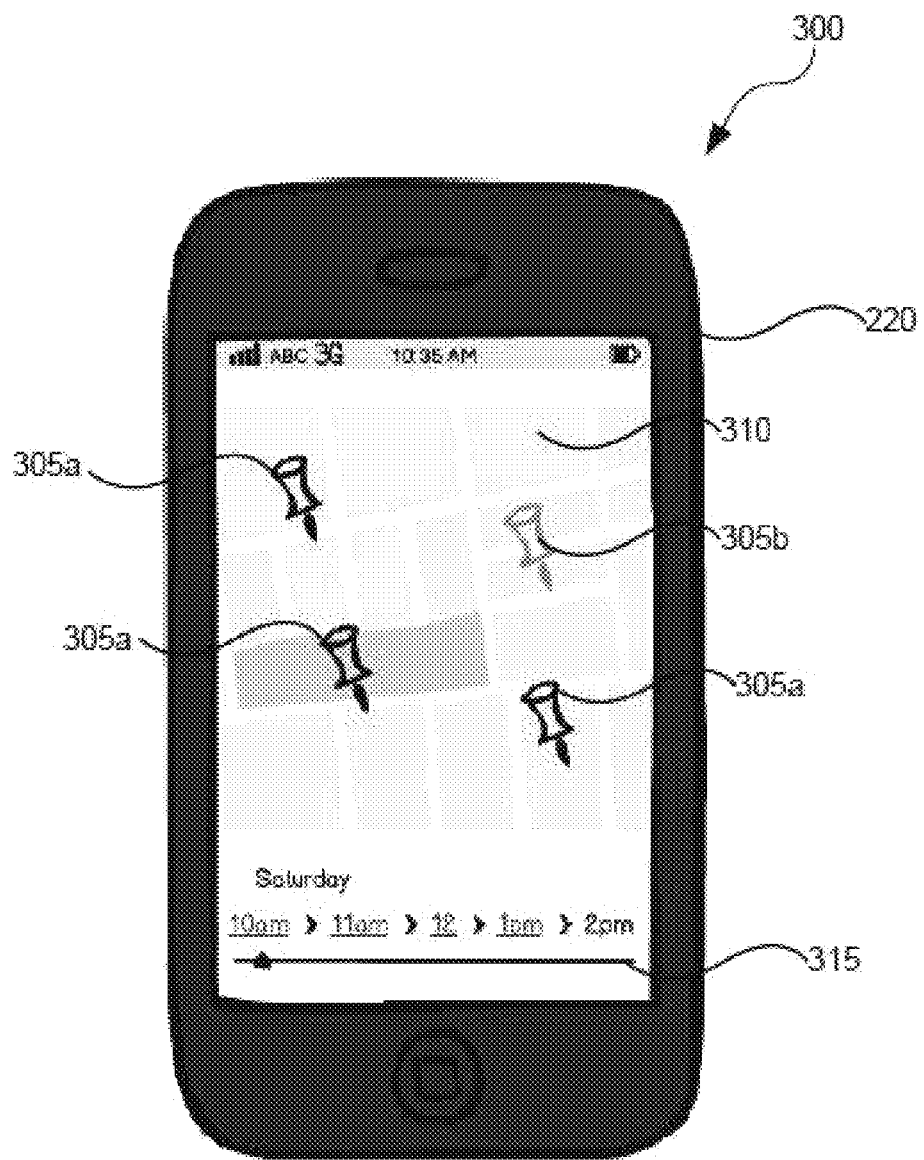
FIG. 3 shows an exemplary interface displayed by a mobile communication device of a map representation, the map representation comprising at least one event artifact.

Turning now to FIG. 3, there is shown an exemplary graphical user interface 300 displayed by the client computing device 220. As is apparent, the graphical user interface 300 comprises a map representation 310 representing a map.

Furthermore, the map representation comprises, overlaid thereupon, at least one event artefact 305 representing an event occurring at a location of the map at an event time.

Furthermore, the interface 300 comprises a time selection control 315 adapted for use by the user in selecting a particular time.

Computer Implemented Method for Rendering a Map Representation

There will now be described a computer implemented method according to various exemplary arrangements wherein the computer implemented method renders a map representation 310 comprising at least one event artifact.

In the exemplary arrangements described herein, a user case example of a user browsing inspection times for one of more real estate properties for sale is employed. As will become apparent from the description below, the user uses the client computing device 220 for viewing when property is open for inspection and at which location. However, it should be appreciated that no technical limitations should be construed upon the arrangements described herein in accordance with this exemplary arrangement. Specifically, the arrangements described herein may be equally applicable to other application, including, for example, a person browsing events at a festival, a person arriving at a new travel destination location and browsing sightseeing activities occurring at particular times a particular locations. In other words, generally, the arrangements described herein are applicable for use by a user using the map representation 310 in viewing when at least one event occurs at at least one location of a map.

Now, using the above example, the user wishes to plan a Saturday's viewing of houses open for inspection. As such, the user configures the client computing device 220 in such a manner. In a preferred arrangement the client computing device 220 is a client communication device such as a smartphone, such as an Apple iPhone, Android smart phone device or the like. In this manner, the user may advantageously draw upon the location ascertaining capabilities of the smartphone device so as to be able to view the map representation 310 that the user's current location.

As alluded to above, in one arrangement, the user is required to download a software application from a software application store, which software application then renders the interface 300 as substantially shown in FIG. 3. Alternatively, the map representation 310 may alternatively be represented by conventional HTML technique, such as wherein the browser application 280 of the mobile computing device 220 retrieved from the Data server 220 map data representing a map 310 for display. The map data may comprise standard HTML, including a HTML5 or the like for the purposes of rendering an animated or otherwise interactive map representation 310. Alternatively, the map content data may comprise Adobe Flash, JavaScript or other client side code for the purposes of rendering an interactive map representation 310. It should be noted that in certain less preferred arrangement, the map representation 310 need not necessarily be interactive.

For example, the user will, using appropriate event attribute input means input that the user is looking for houses open for inspection in Sydney on 30 Jul. 2013 for which the asking price is less than $1.2 million and the open times are between 10 AM and 2 PM.

As such, the Data server 210 will search within the database 270 for matching houses with the given event attributes. The that is, the Data server 210, will send to the client computing device 220 map data representing the map 310 (unless the client computing device 220 has cached the map data already) and the event artefact data representing the one or more matching houses. Specifically, the event artefact data represents an event time in an event location. For example, a single event artefact returned by the Data server may represent that a particular house is open for inspection at 29 Bromley St, from 11 am to 12 noon.

The client computing device 220 then stores the event artefact data in a database, memory device or otherwise of the client computing device 200.

Now, the client computing device 220 is adapted to receive time selection data representing a time selection. Specifically, the interface 300 comprises the time selection control 315 adapted for use by the user in specifying a particular time. In the arrangement given, the time selection control comprises a slider control bounded within the user's predetermined inspection times of 10 AM to 2 PM. In the example given, the user has selected a time of 10 AM.

In this manner, the client computing device 220 is adapted to display only those event artifacts corresponding with the time of 10 AM. In one manner, the client computing device 220 may represent those event artifacts being proximate in time to 10 AM, such as those occurring from 9:30 AM to 10:30 AM.

In an alternative arrangement, the time selection control 315 is adapted for use by the user in specifying a start time and an end time. In one manner, the time selection control 350 may comprise two grips, the first adapted for specify the start time and the second for specifying the end time. The advantage of the time selection control bring adapted in specifying a start time and an end time is in the user be able to specify a variable time period, such as a time period spanning one hour, two hours and the like.

In a further arrangement, the interface 300 is adapted to recognise a gesture of the user in specifying the time selection. For example, in using the time selection control 315, the user may use a "pinch gesture" to specify the time period (analogous to a zoom) and a sideways panning gesture to specify the start or end time (analogous to a scroll or pan).

In other arrangements, any interaction with the client computing device 220 may be utilised for the purposes of specify in a particular time. For example, where the client computing device 220 takes the form of a mobile communication device, the user may use the physical buttons of the mobile communication device, such as the volume controls or the like for the purposes of specifying the particular time.

Now, having received the time selection data representing the time selection from the user, the client computing device 220 is adapted to render the map representation in accordance with the map data, event artefact data and the time selection data. Specifically, the client computing device 220 is adapted to render the map representation 310 comprising only those event artifacts corresponding with the user time selection.

In one arrangement, the client computing device 220 may be adapted to render the map representation in accordance with any relation between the event artefact data and the time selection data, including over and above those specifically described herein. For example, should a person select Monday as a day of the week, the client computing device 220 may be adapted to select other event artefact data occurring on subsequent Mondays also.

For example, in the exemplary interface 300 there are represented three event artifacts 305*a* shown in black. In this manner, the three event artefact 305*a* represents houses are available for inspection at or around 10 AM.

Also given in the interface 300 is a further event artefact 305*b* shown greyed out, indicating that this particular house is not available for inspection at or around 10 AM in the morning. It should be noted that the event artefact 305*b* being shown greyed is exemplary only and in one arrangement the event artefact 305*b* may be omitted entirely from the representation 310. Also, in further arrangement, the event artefact 305 may be displayed in a manner depicting the events time, such as wherein the most proximate in time event artefact shown in red, wherein the furthest event artifacts in time shown in blue and wherein the event artefact in between are shown in a sliding scale from red to blue.

Now, by manipulating the time selection control 315 the user may select differing times of the day, wherein, at each selected time of the day, differing event artifacts 305 appear and disappear depending on the time selection. For example, should the user configure the time selection control 315 to represent 1 PM, event artefact 305*b* may appear.

Ideally, the user may select an event artefact 305 shown on the map representation 310, whereby information relevant to the selected event artefact 305 is caused to be displayed.

In a preferred arrangement, different forms of indicia can be employed for displaying event artifacts having different characteristics. In this manner, a visual indication of the characteristics of each event artefact can be readily discerned.

Figure 4:
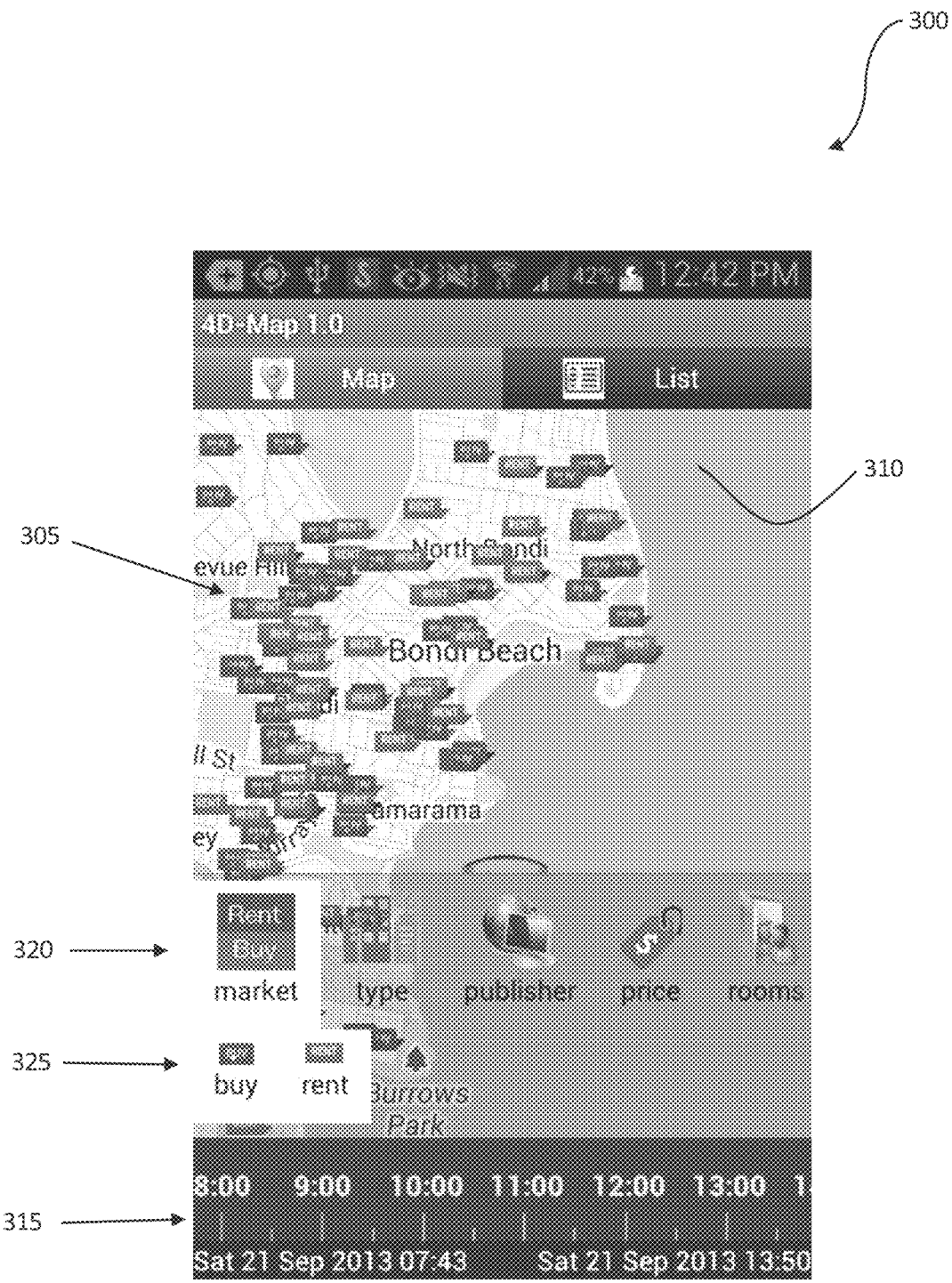
FIG. 4 shows an arrangement of an interface displayed by a mobile communication device of a map representation with a first of a number of user selectable categories selected, the map representation showing different event artifacts represented by different indicia relevant to the category selected.

Referring to FIG. 4, the interface 300 provides a number of category options 320 for selection by the user. Within each category option, different indicia 325 are employed to represent different characteristics of event artifacts relevant to the particular category option.

In the example shown, there are five category options 320 available for selection by the user. In FIG. 4, a 'market' type category option has been selected. Within this category there are two different indicia 325, one indicium representing a property available to buy and the other indicium representing a property available to rent. As shown, event artifacts 305 are rendered on the map representation in accordance with the indicia type relevant to each event artifact.

Figure 5:
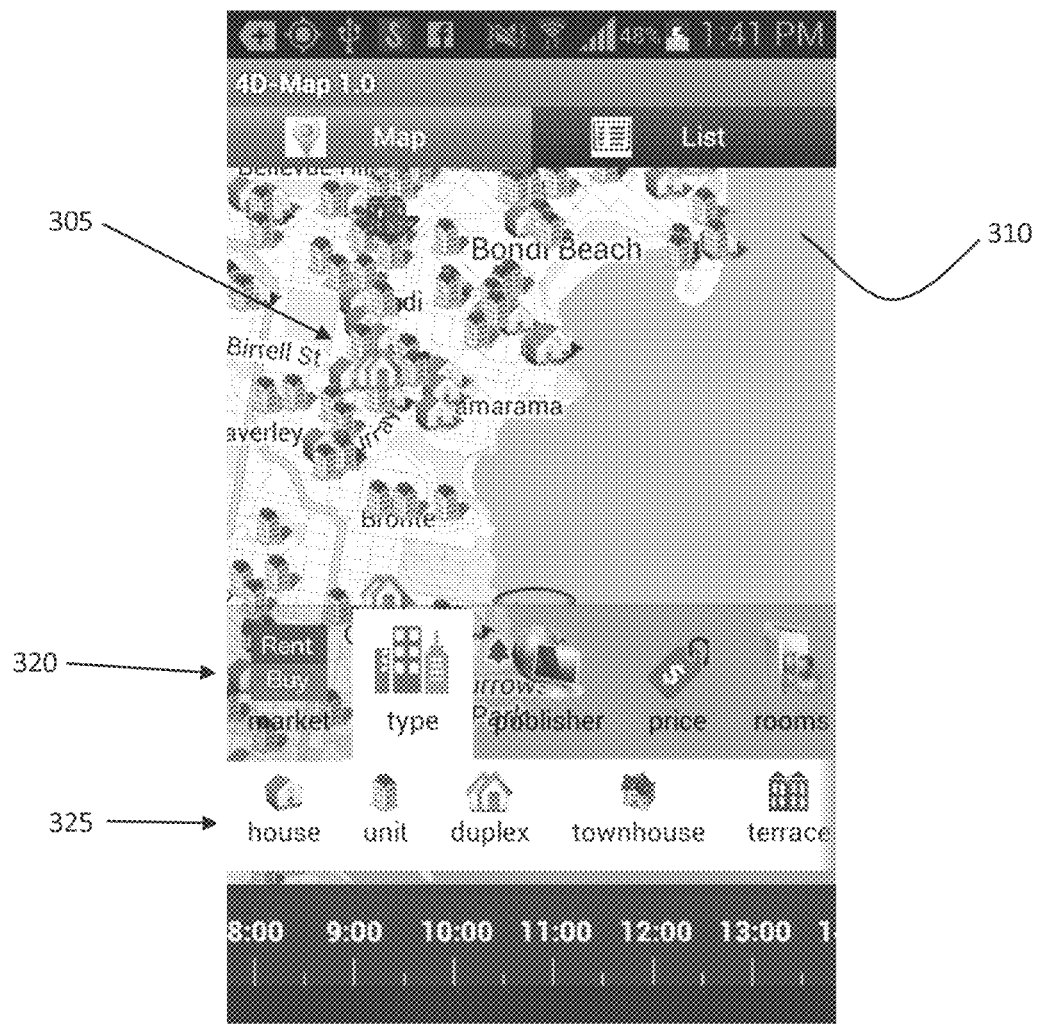
FIG. 5 shows the arrangement of FIG. 4 with a second of the number of user selectable categories selected.

In FIG. 5, a 'property type' category has been selected. Within this category there are a number of different indicia 325, each representing different property types, for example, houses, apartments, townhouses, duplex, etc. As shown, event artifacts 305 are now rendered on the map representation in accordance with the indicia relevant to each event artefact under this selected category.

Figure 6:
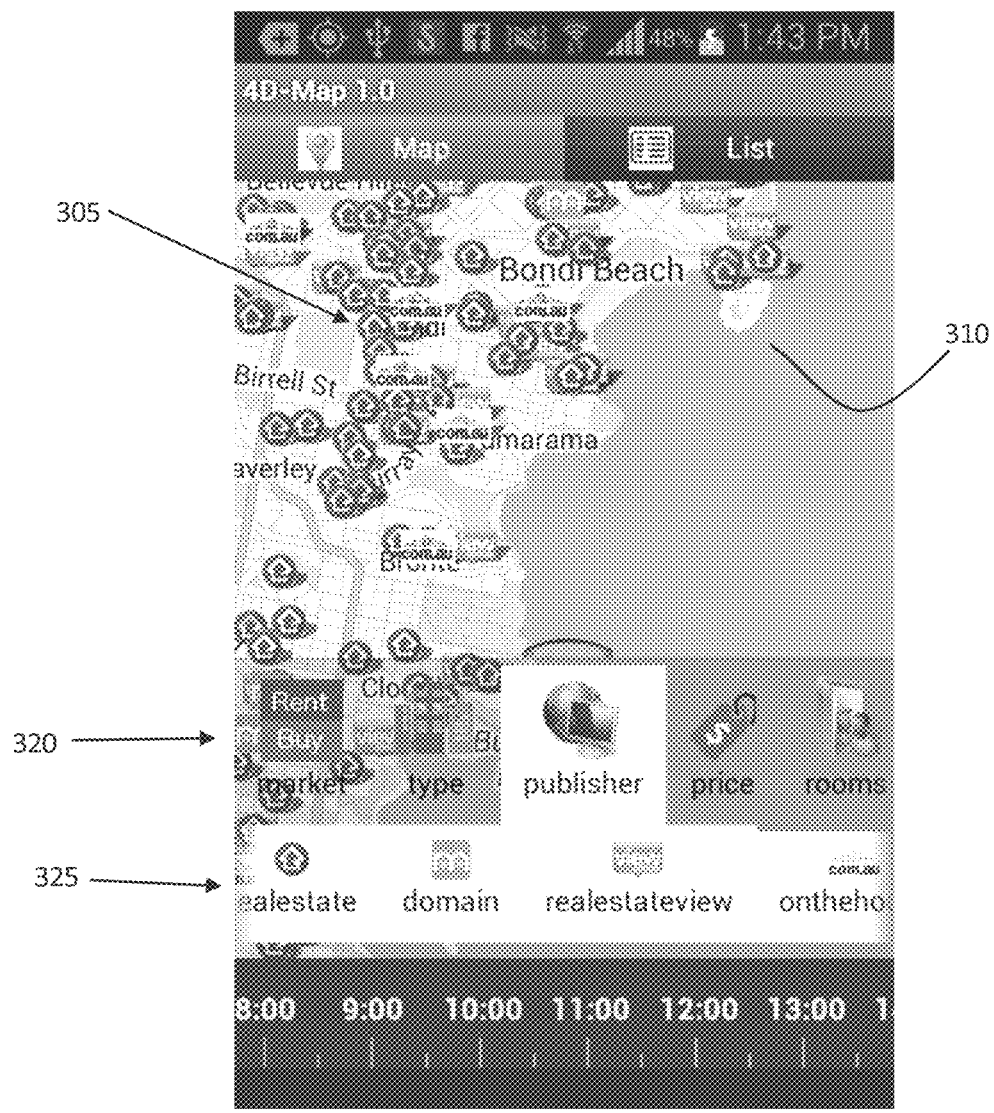
FIG. 6 shows the arrangement of FIG. 4 with a third of the number of user selectable categories selected.
Figure 7:
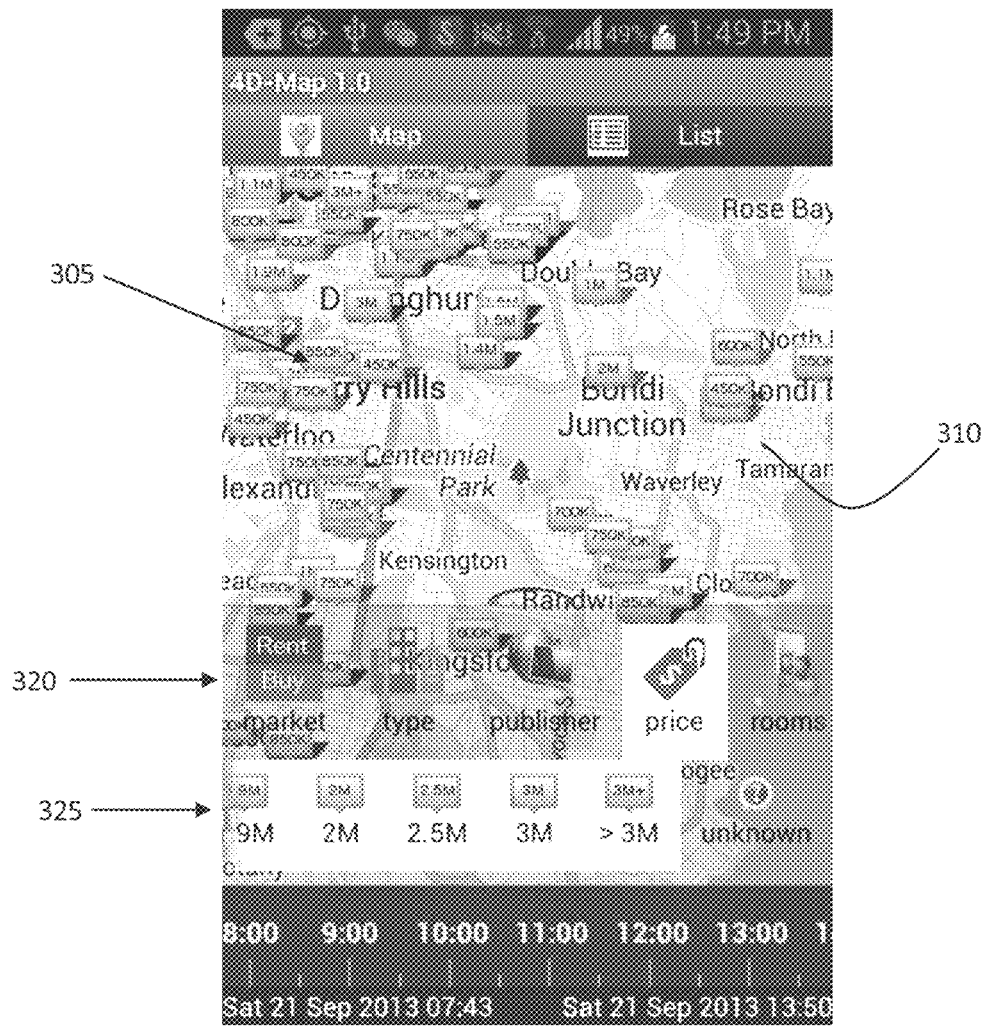
FIG. 7 shows the arrangement of FIG. 4 with a fourth of the number of user selectable categories selected
Figure 8:
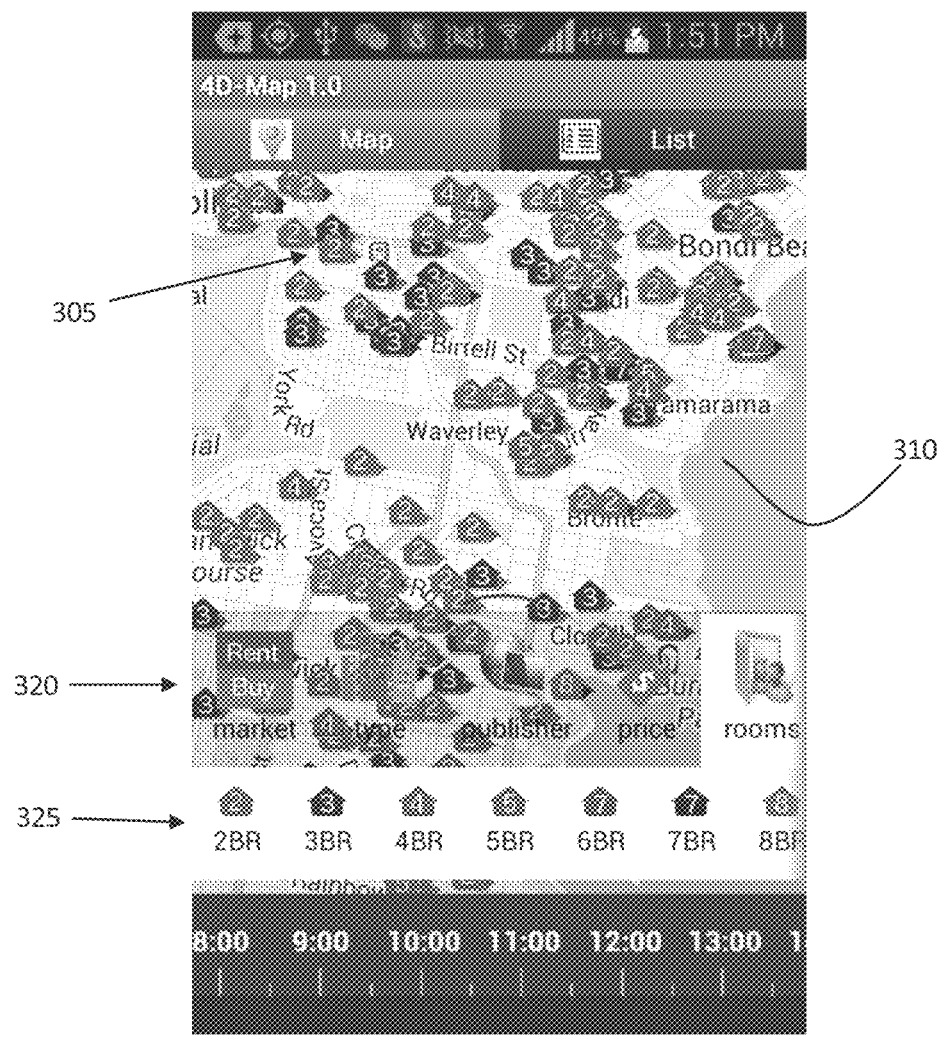
FIG. 8 shows the arrangement of FIG. 4 with a fifth of the number of user selectable categories selected.

FIG. 6 shows the selection of a 'publisher' category within which there are different indicia 325 representing different sources of property listings. In FIG. 7, a 'price' category is selected, within which there are different indicia 325 representing different price brackets of properties. In FIG. 8, a 'room number' category is selected within which there are different indicia 325 representing properties having different numbers of bedrooms.

Ideally, within each category selection 320, a user may select or deselect certain indicia 325 within the category. In accordance with the user's selection of indicia, the map representation 310 is rendered to show only event artifacts 305 associated with the selected indicia 325. Consequently, the user is provided with a manner in which to filter the display of event artifacts so that only those possessing a characteristic of interest to the user are shown on the map representation 310.

Figure 9:
FIG. 9 shows an interface for allowing a user to enter customization parameters.

In a preferred arrangement, a user may input customized parameter selections 350 across more than one category via a custom configuration option, see FIG. 9. In this manner, regardless of which category is selected by the user, only event artifacts which meet the characteristics of the users customized parameter selections are shown on the map representation 310. In an exemplary arrangement, every category has an attribute called 'sticky flag', which if set, will activate the category's filtering effect in the background even when another category is selected. This feature is useful when the user wants to narrow down the selection by overlaying the select effects from multiple categories. For example, if a user only wants to see properties in the 'rental' market while viewing with the 'type' category, then he/she can:
1. Go to the Market category
2. Click to toggle and unselect 'buy'
3. Then long click on the 'Market' category icon to open up the Category options dialog
4. Check 'sticky' option
5. Close the category options dialog; and
6. Select another category, say the 'Type' category.
7. Now the category selection is changed to 'Type' and the events are now represented with artefacts reflecting house types. However, only properties in the rental market are shown because the Market category is set to sticky. Multiple sticky categories is possible for narrowing down the selection to very specific requirements, so relatively few events will be shown but all satisfying every sticky category so set.

Caching of Event Artefact Data

Now, there will be described differing manners by which the client computing device 220 caches the event artefact data. Specifically, the client computing device 220 may be required to cache the event artefact data for responsiveness purposes. For example, were the client computing device 220 adapted for receiving the users time selection so as to then request matching event artefact data from the Data server 210, the time delay given the communication lag between the client computing device 220 and the Data server 210 would render the map 310 unusable.

As such, the client computing device 220 is adapted for caching the event artifacts data so as to be able to substantially instantaneously display the appropriate event artifacts from the cache data.

As such, the client computing device 220 (or the data server 210) is adapted for selecting which event artefact data to cache.

There are a number of manners by which the client computing device 220 may select which event artefact data to cache. Their first manner, the client computing device 220 is adapted to cache event artefact data for a particular region. Specifically, referring to FIG. 3, the map representation 310 is bounded by four map coordinates. In this manner, the client computing device 220 may be adapted to request, from the Data server 210, event data having a location within the four map coordinates. In this manner, having downloaded the event artefact data for the region shown by the map 310, the user may configure the time selection input 315 so as to allow the client computing device 220 to reveal and hide appropriate event artifacts 305 in a substantially real time matter.

In a further arrangement, and given that users may zoom or pan the map representation 310, the client computing device 220 may be furthermore adapted to request event artefact data within a bounding region of the display to map portion 310. In this manner, should the user panel or zoom the map 310, rather than having to wait for the client computing device to request from the Data server 210 new event artifacts data for the new displayed map region, the client computing device 200 would have already cached the appropriate event artefact data for the new map region.

In other arrangements, the client computing device 220 may use different techniques for the purposes of selecting which event artefact data to cache. One further such manner is in the client computing device 220 employing a route calculation to predict a route so as to cache the appropriate event artefact along the route in advance.

In other manners, the client computing device 220 may cache event artefact data in accordance with event attributes. For example, should the user be browsing for houses, the client computing device 220 may be adapted for caching only those event artifacts relating to houses, and not, for example, those relating to fast food outlets.

Yet further, the client computing device 220 may cache the event artefact data in accordance with particular time characteristics, wherein, for example, where a person were looking for a holiday house, the client computing device 220 may cache event artefact data for a longer time period, as opposed to were the person looking for houses open for inspection.

Furthermore, the client computing device 220 may cache the event artifacts data in accordance with a particular domain representing different artefact types. For example, the client computing device 220 may cache event artifacts relating to open houses for inspection in accordance with a first caching criteria and cache second event artifacts in relation to holiday houses in accordance with a second and different caching criteria.

Route Calculation

In one arrangement, the client computing device 220 is adapted to perform a route calculation for a user in accordance with the event attribute data. For example, in this manner, the client computing device 220 (or the Data server 210) would calculate a route so as to allow a person to visit each location of each event artefact in sequence.

For example, should a person wish to view four houses on a Saturday morning as substantially shown in FIG. 3, the client computing device 220 may be adapted to display driving directions timing directions and the like so as to direct the user to arrive at each event location at the appropriate time. Such route calculation may be performed in an automated manner or in accordance with user selection, such as wherein the user selects the specific houses he wishes to view.

In calculating the route calculation, the client computing device 220 may make allowance for travel between each location which may be in accordance with the distance between each location. Furthermore, in calculated the route calculation, the client computing device may be adapted to display those locations which cannot be reached, such as where to houses are show simultaneously. In this manner, the user may be prompted to select which of the conflict at houses to view.

It should be noted that the route calculation may be utilised for calculating the routes of more than one agent. For example, if m agents were to visit n events, the client computing device 220 would calculate the optimum route for each of the agents or the overall optimum performance for all of the agents. Also, the route calculation may be performed in accordance with additional constraints such as where a particular agent cannot attend a particular event and wishes to delegate (or cancel) that visit, the client computing device 220 would be configured to generate the route accomplish in taking into account this particular constraint.

APPENDIX A

1. Client App
    1.1. The client app runs on a user device (see point 2).
    1.2. The 4D-map client app presents a 2D or 3D geographical map annotated with event artifacts (see point 4).
    1.3. At any one time, only event artifacts that have a time proximity (see point 7) to the current time window (see point 5) are shown.
    1.4. Each 4D-map session (see point 3) can associate with one or more domains (see point 8) where only events belonging to the associated domains are visible or updateable in the session.
    1.5. The client app provides an interface to create, remove, or update events represented by the artifacts in the current domain.
    1.6. The client app provides or interacts with a time widget (see point 10) to define, adjust, or fine tune the current time window (see point 5)
    1.7. Where feasible, the visibility of individual event artifacts will be updated incrementally and dynamically (see point 14) with respect to the change in the current time window.
    1.8. The client app has event filtering mechanism (see point 12) to display only events of interest.
    1.9. The client app allows user to inspect the event details (see point 16) when the user selects the corresponding event artifact in the map.
    1.10. The client app communicates to a central server (see point 17) to receive or update event data.
    1.11. The client app maintains a local event cache in order to maximize performance (see point 21).
2. User Device
    2.1. This refers to any device that is capable of displaying 2D or 3D geographical map or model annotated with a single or multiple event artifacts.
    2.2. This refers to any device that is fixed—such as PC, or mobile—such as a smart phone or a tablet.
    2.3. This refers to any purpose specific devices such as a GPS navigation system that may use this invention.
    2.4. The device may use map and location services provided by Google Map, or other providers.
    2.5. The device has the capability to show artifacts either as overlays or support other forms of map annotation feasible for this implementation.
3. Session
    3.1. A session is the duration where the client app has entered into the state ready to browse or update the 4D-map.
    3.2. A session must associate with at least one or more domains. Only events belonging to the domains can be browsed, created, or updated within that session.
    3.3. The client app supports switching between active sessions.
4. Event Artifacts
    4.1. An event artifact is a graphical symbol that represents the occurrence of an event in the map associated with that space. An artifact could be shown as a volume, an area, a shape, a line, or an icon image.
    4.2. An event may be displayed in different artifacts when there governed by filtering rules (see point 12). What this means is that an event may take different appearances in the map depending on the current context.
    4.3. Each artifact found in the map only refers to one event.
5. Current Time Window
    5.1. The current time window is a value pair denoted by (Ts, Te) where Ts and Te are the start and end time of the period of observation, Te>=Ts.
    5.2. The current time window is specified to select events that are time proximate (see point 7)
    5.3. The current time window can be specified through the time widget interface (see point 10)
6. Event Time
    6.1. A simple event time consists of an interval represented by a start and an end time.
    6.2. A complex event time is defined in terms of an event schedule. The schedule can have recurrences of the event described in certain hours in a day, days in a week, and weeks of a month etc. (For example, an indoor soccer club organizes soccer session at 7-10 pm every Monday from February to December 2016).
7. Time Proximity
    7.1. An event time is proximate to a time window when the event time satisfies certain condition (such as overlapping) with the given time window. An event time may also be proximate because it is within a certain threshold although not overlapping with the time window.
    7.2. The client device has a set of algorithms to determine proximity between the current time window and a simple or a complex event time.
    7.3. Events that are proximate are candidates to shown in the map using artifacts determined by the active filtering rules (see point 12)
8. Domain
    8.1. A domain defines the type of events that may be represented on the map.
    8.2. Domains are different due to the differences in their data abstractions. For example, an open house inspection event may have attributes like number of bedrooms, ask price etc. These attributes are not required in another domain such as City of Sydney cultural events.
    8.3. Different domains may be related hierarchically via a class inheritance relationship.
    8.4. Event start and end time, location attributes such as longitude, latitude and altitude are generic attributes. These attributes are defined in the root domain that can be inherited by all derived domains.
9. Event State
    9.1. An event can exist in a number of different states in its life cycle. For example, an event may exist in one of the following states: inactive, pending, opening, running, closing, closed, and inactive.
    9.2. Event is in inactive state if the current time is well before the start time, or well after the end time. The amount of lead-time or lag-time can be customized in the filter rule.
    9.3. Event is in pending state if the current time is approaching the start time of the event.
    9.4. Event is in opening state if the current time is shortly after start time.
    9.5. Event is in running state if the current time selection is well after start time, and well before the end time.
    9.6. Event is in closing state if the current time is approaching the end time of the event.
    9.7. Event is in closed state if the current time has recently passed the end time.
    9.8. The threshold time amount differentiating between adjacent states is defined by the filtering rule.
10. Time Widget
    10.1. A time widget is a component provided to the user for defining the current time window.
    10.2. A time widget may be implement with software or hardware.
    10.3. A time widget provides several time setting modes (see point 11) to set the current time window.
    10.4. A time scroll bar is a specific implementation on multi-touch devices for use in the manual mode. Adjustment to the current time window can be made via one of the three actions, namely: (1) Pan or scroll—which moves the time window with single touch without changing its width (2) Zoom In—which narrows the time window by dilating the time bar with two touches, and (3) Zoom Out—which widens the window by constricting the time bar with two touches.
11. Time Setting Modes
    11.1. Setting of current time window can be in manual or auto mode.
    11.2. In manual mode, the current time window will remain unchanged until it is manually intervened.
    11.3. In the automatic mode, the will track in real time and automatically adjust current time window so that the current time window is always up to date against the real-time.
    11.4. For both in manual and auto mode, current window width can be fixed at familiar intervals in multiple of second, minute, hour, day, week, month, or year.
12. Event Filtering
    12.1. The event filtering determines which events are to be displayed in the map.
    12.2. Events can be selected based on filtering rules of a domain (see point 8).
    12.3. Each client session must associate with one or more domains. Only events belonging to the associated domains may be represented in the map.
    12.4. Further refinement to the selection within the domain can be achieved with event filters.
    12.5. An event filter defines the artifact to display for an event based on either attribute filtering (see point 12.6) and state filtering (see point 12.7).
    12.6. Attribute filtering refers to selection of events for display by checking the value in the corresponding event attribute against the filtering conditions.
    12.7. State filtering refers to comparing the current time against the event start and end time to determine which state the event is in (see point 9).
    12.8. Distance filtering refers to comparing the current location against the event venue to determine the event artifact.
    12.9. An event filter may also combine the conditions of attribute, state, and distance filtering into a composite filter. For example, highlight any properties in striking red if it is in the pending or opening state and if the venue is within 2 kilometers radius from the user's current location.
    12.10. One or multiple event filters can be selected individually to show or hide events affected by these filters.
    12.11. Filters related to the same attribute of an event can be group into a context (see point 13) so that by selecting the context, only filters of this context may be applied to govern the artifact display.
    12.12. Each filter in a context can be activated or deactivated. Only the active filters will be applied.
    12.13. Unlike filters, only one context can be selected at a time. Selecting another context will deselect the previous selection.
13. Context
    13.1. Conceptually, a context is a view of the events related to a certain interest. For example, a context called Price may display properties at different price levels using different artifacts. Whereas another context called Building Type will differentiate the same set of events by their types. A State context will show what states the events are in, and so on.
14. Dynamic and Incremental Display Update
    14.1. When a user adjusts the current time window with the time widget, it is possible that several transient time values are received, before the final window is known. For example, if the time bar widget is used, the Android OS sends multiple transient values whenever the time bar is moved or zoomed.

14.2. Dynamic update refers to the animation effect of making the event artifacts to appear or disappear using to the transient values. This is possible if the device has a fast refresh for the display.

14.3. Incremental update refers to taking the transient states as input to update the display, before the final time window value has been determined. This mode is possible only if the transient update is available on the device.

14.4. Most modern platforms support these two modes of update. However, if the given platform is incapable of providing these features, then these would not be available and the display will only be updated when the final time window is defined.

15. Event Attributes 15.1. An event attribute is a key-value pair that forms parts of the record of the event stored in the database.

15.2. An event attribute contains value of certain scalar type, which could be a text or a number.

15.3. A textual attribute may be a reference to another resource, which resides either locally or externally.

16. Event Details 16.1. Event details are the information about an event.

16.2. Event details are the superset of Event Attributes (see point 15)

16.3. Event details contain information of all its attributes as well as any derived information that are fetched and composed from external sources. A typical example is an attribute being a hyperlink to web page, and the event details may include derived information such as images and text scraped from the referenced page, which were not originally kept as the event's attributes.

16.4. Event details are most relevant to the user's interest that should be presented in a proper layout when the event is inspected.

16.5. Event details can be presented in certain structures determined by the configuration for that domain.

16.6. The most common form of presentation begins with a top page containing a synopsis of the event with one image.

16.7. The top page, as well as other pages, may contain links to other pages that may or may not be served by a centralised server.

16.8. Further levels of verbose information can be accessed if the user traverses the links embedded in the page.

17. Server 17.1. The server is a process hosted on a high performance scalable infrastructure environment accessible on the web from the client app.

17.2. The server must be capable of serving a large number of client apps concurrently accessing the event data without suffering significant performance degradation.

17.3. The server may act passively—to serve requests from the clients.

17.4. The server may also act actively—to push notifications to the clients to inform them about updates.

17.5. The server communicates to a database server to create, retrieve, or update event data.

17.6. Apart from communicating to the clients, the server also provides a web interface for administration and manual data updates.

17.7. The server has a suite of reporting and maintenance tools such as backup and restore utilities.

18. Database 18.1. The database is running on a high performance scalable infrastructure environment accessible from the 4D-map server, and other processes described hereunder (see point 19).

18.2. The database contains event data and other data for administration purpose.

18.3. Domain hierarchy is reflected in the relational schemas.

18.4. The database server may accept database connection from the 4D-map server, the event data importer (Error! Reference source not found.), and other support and maintenance processes.

19. Event Data Importer (EDI)

19.1. This refers to the programs designed to import event data from external sources to populate the event database.

19.2. Generally the EDI retrieve information from third party sources, which include static input like a spreadsheet, dynamic input like RSS feed, or web pages obtainable from the web.

19.3. EDIs may vary from simple to sophisticated—from a standalone script to a number of custom-built programs that are capable of visiting certain public web sites to scrape relevant information into event data.

20. Client Server Communication 20.1. Mobile clients communicate to the server via WIFI or mobile network connection.

20.2. A fix set of protocols has developed for mobile clients to request the download, creation, and update of event data. The download operation being the most frequently performed.

20.3. Given that downloading event data is the most common operation performed, the use of a good caching algorithm is crucial for the system's performance.

20.4. Each download request R is sent to the server containing the following attributes: $\{(x', y', z', t'), (x'', y'', z'', t''), Tu\}$ where $(x', y', z', t')$ is the minimum coordinate, and $(x'', y'', z'', t'')$ the maximum coordinate, which represents the four-dimensional volume containing the events we are observing. Tu is the time since the user's last access to this volume. The server will take this time into consideration and returns only events that have been created or updated after this time.

20.5. Each database field that corresponds to a particular field in the request R is indexed, so the server is able to find all the events quickly.

20.6. Concurrent download is made possible so that there can be multiple downloads running asynchronously to speed up performance.

21. Caching Strategy 21.1. The caching algorithm ensures maximum reuse of fetched data, but it still allows updates to happen in an efficient manner.

21.2. An event is modeled as a line along the time axis in a four dimensional volume starting at point $(x, y, z, t')$ and ending at $(x, y, z, t'')$ where $t''>t'$. In its simple form, we are dealing with the problem domain where x, y, z are invariant over time.

21.3. A bounding volume $\{(xb', yb', zb', tb'), (xb'', yb'', zb'', tb'')\}$ for a given set of n events occurring from $(xi, yi, zi, ti')$ to $(xi, yi, zi, ti'')$ where $i=1 \ldots n$ exists and must satisfy the below relationship: $xb'<=Min(xi')$ $xb''>=Max(xi'')$ $yb'<=Min(yi')$ $yb''>=Max(yi'')$ $zb'<=Min(zi')$ $zb''>=Max(zi'')$ $tb'<=Min(ti')$ $tb''>=Max(ti'')$ for all $i=1$ to $n$.

21.4. The Minimum Bounding Volume (MBV) is the smallest bounding containing all vertices Vi where I=1 . . . n such that the condition mentioned in point 21.3 holds.

21.5. The minimum bounding volume, say M, of two arbitrary bounding volumes BV1 and BV2 can be computed from the function MBV (union volume), so M=MBV (BV1, BV2) where BV1={(x1', y1', z1', t1'), (x1", y1", z1", t1")} BV2={(x2', y2', z2', t2'), (x2", y2", z2", t2")} M={(x', y', z', t'), (x", y", z", t")} x'<=x1'<=x1"<=x" and x1'<=x2'<=x2"<=x" y'<=y1'<=y1"<=y" and y'<=y2'<=y2"<=y" z'<=z1'<=z1"<=z" and z'<=z2'<=z2"<=z" t'<=t1'<=t1"<=t" and f<=t2'<=t2"<=t"

21.6. Each time the client sends request to the server it specifies a bounding volume based on the browser's current settings. Let's call this BV where BV={(xc1, yc1, zc1, tc1'}, {xc2, yc2, zc2, tc2")} BV is checked against all volumes in the cache, if no overlap occurs, the events within BV will be retrieved from the server and cached. The post condition is the cache now populated with events in BV.

21.7. On the other hand if the user has requested another BV which overlaps with one or more other existing bounding volumes in the cache, say BV0, . . . BVn, then the minimum bounding box of all bounding volumes will be calculated, such that BVf=MBV (BV, BV0, . . . , BVn) which is the same as BVf=MBV (BV, MBV (BV0, . . . MBV (BVn−1, BVn) . . . )) and the request will be sent to the server to retrieve all events that are in the so called Gap Volumes, which are rectangular volumes bounded by BVf but not overlapping with any of BV0, . . . BVn. The gap volumes are calculated as the difference between the minimum bounding volume BVf subtract the cached as expressed by the function DV where DV=BVf-BV0 . . . -BVn The result of the DV calculation is a list of bounding volumes representing the difference of the two given volumes, where DV=BVd0, . . . BVdk where k>=0

21.8. The list of Gap Volumes DV (see point 21.7) determines the volumes that are still unknown to the local cache; therefore the events in these volumes must be downloaded from the server. The request to download DV can be forwarded to the server as multiple asynchronous requests to download BVd0, . . . BVdk concurrently. Event data downloaded is stored in the cache and the new bounding volume BVf is created as a replacement of all the content volumes before the merge including BV0, . . . BVn and the gap volumes BVd0, . . . BVdk which will be removed from the cache database. The last update time of BVf is set to the current time.

21.9. Only a single call to the server with the list of gap volumes is required to retrieve the gap data. Therefore communication overhead to the server is minimal despite multiple gap volumes.

21.10. The post condition is the cache now has a new merged bounding volume BVf that is the minimum bounding volume of BV, BV0, . . . BVn. It contains all the up to date data downloaded from the server and has the last update time set.

21.11. Each BV in the cache has a time stamp of the last update time. This time is compared to the current real time, and if the elapsed time is greater than a preset threshold, a refresh will be performed.

During a cache refresh, a new request will be sent to the server with the last update time stamp to retrieve data that was created since last update. Regardless of whether there is any data returned, the last update time in the cache is replaced with the current time.

Event Occurrences

Many events can have recurrence based on a described schedule. For example, an event may repeat daily at certain times, or repeat weekly on certain weekday and time, or repeat monthly on certain weeks, weekday, and time. There are also exception to event occurrences, such as "except Easter and Christmas". Accurate reflection of event occurrences presents a great challenge as each event now not only associates with just a simple start and stop time, but rather, a complex set of start and stop times defined by the schedule.

Exemplary arrangements of the system as disclosed herein can be configured to execute in real-time and to be able to handle a majority of event occurrence types. The extension to handle complexity of occurrences affected the following parts of the system:

The event importer—the event importer is adapted to parse the complex time schedules published on the source sites.

The database—the database schema is adapted to accommodate complex occurrence structures instead of a pair of start time and stop time.

The server—the event data server is adapted to be able to query the database for any events that potentially overlap with the request time.

The client device—The client device is adapted to have an internal representation of the occurrences in order to detect the events that have actual overlap with the current time range.

In accordance of the arrangements of the aspects of the invention as disclosed herein, an event is a collection of data attributes, for example, an event may be one or more of a:
title
summary
image
source URL
location info—such as geo coordinates
occurrence list—each occurrence is a specification of when the event will take place.

Event Caching

In particular arrangements of the aspects of the invention as disclosed herein, the client device is adapted to download more events than those that are finally shown on in the display in order to minimise latency when the user traverses in the time dimension.

Event Handling

In particular arrangements of the aspects of the invention as disclosed herein, the typical life cycle of event handling is as follows:

User move or zoom the map

Google map app running in the background detected the movement and calls the Google map server to fetch the map data, and it then updates the map display.

At the same time, the map app invokes the user's call back method MapMoved handler to handle the movement.

The handler calls the data server to return event data based on the new viewport coordinates of the map, the time range that contains the current range selection, and the domain (or channel) name.

the data server performs a query to its database to find all the events within the given map area, with their event time proximate to the given time range from the event data table.

The result list of events are returned to the client device.

The client device performs detailed level time filtering to check if the occurrence of each event overlap with the current time range.

The client device updates the display to reflect the new result from the result list of events.

Client Computing Device 220 Providing a Controllable Time Period Display

In a further arrangement of client computing device 220, may be adapted for providing a controllable time period display. An exemplary example of a time period display 1000 according to the present arrangement is shown in FIG. 10.

The time period is displayed in the form of a visual scale having evenly separated increments displayed from a first end of the display to an opposite second end of the display. The left side of the display represents a start time for the time period while the opposite right side represents an end time for the time period. As shown, the start and end times are separately displayed. Ideally, as shown, the increments can be of different sizes to represent different scales of units of time. The illustrated example employs a small, a medium and a large scale. The spacing between adjacent increments or scales, which is defined as the number of pixels between adjacent scales, represents a unit of time within the time period displayed.

The controller provides user interaction through multi-touch gestures such as scroll, fling, and zoom without the need of typing. How the controller employs the different gestures will now be described.

Figure 11:
FIGS. 11 to 19 show the time period controller of FIG. 2 following different user input commends.

FIG. 11 shows the time period display in an initial position.

Figure 12:
Figure 13:

FIG. 12 shows the time period display 1000 following a 'scroll up' input. In 'scroll up', the user employs a single touch on the touchscreen which drags the scale from its initial position steadily in the horizontal direction and release. The point of release becomes the new position as shown. It should be noted that the start and end time have changed and moved forward in time, although the duration of the time period is unchanged. A 'scroll down' input operates in the same way but operates to move the start and end time shown in time period display 1000 backwards in time, see FIG. 13.

Figure 14:
Figure 15:

A 'fling up' input, allows a user to apply a quick swipe and release action on the scale to the left from its initial position. The time scale continues to slide after the release for a few seconds before it eventually decelerates and coming to a standstill and settles at the position shown in FIG. 14. Note how far it has skipped forward in time with just a swipe action. This feature is useful for the user to skip quickly to a distant time range. A 'fling down' input operates in the same way but skips backwards in time, see FIG. 15. Again, the actual duration of the time period displayed is unchanged.

To adjust the duration of the displayed time period, the user can use 'zoom' inputs.

Figure 16:
Figure 17:
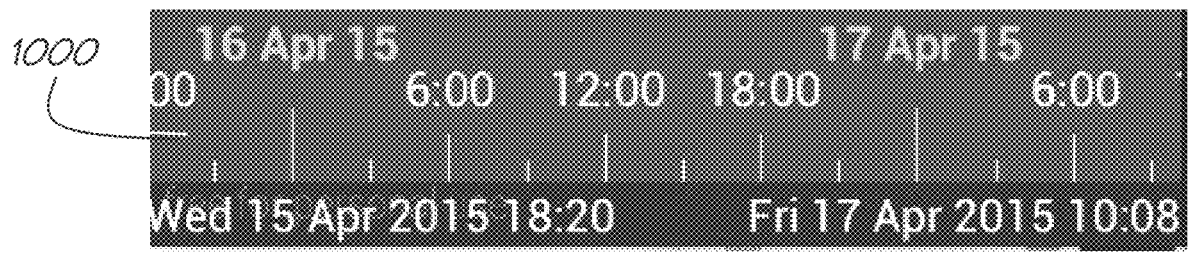

A 'zoom out' input, allows a user to place two fingers on the time scale display, drag both fingers closer and then release. Each finger tracks a position on the scale, which will follow the movement of that finger. By drawing the two fingers closer the scale will shrink and each unit time interval will appear smaller, i.e. the separation between increments decreases. If the pixel distance of the time unit interval is within a min/max threshold, no relabelling is required, see FIG. 16. If the pixel distance separating adjacent scale marks falls under a threshold, the display changes the separation between increments back to a default separation and relabelling of the scale will take place, see FIG. 17. Note how the resolution of the scale has increased from 2 hours to 3 hours.

Figure 18:
Figure 19:
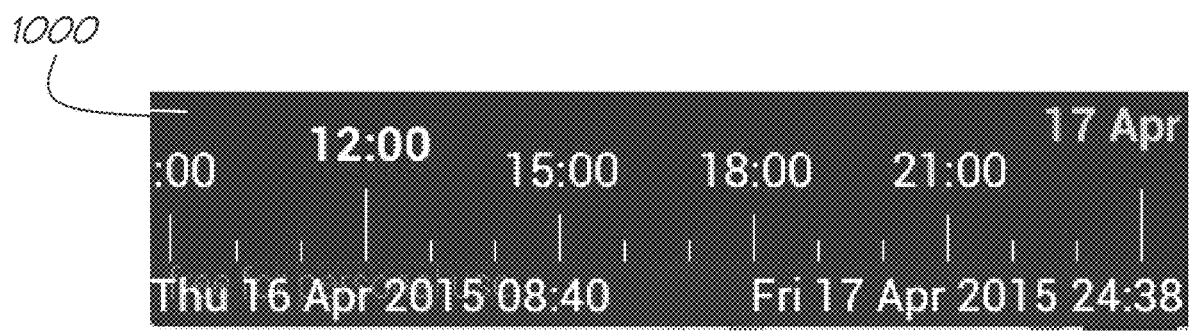

A 'zoom in' input, allows a user to place two fingers on the time scale display, drag both fingers further apart and then release. Each finger tracks a position on the scale, which will follow the movement of that finger. By pushing the two fingers further apart the scale will expand and each unit time interval will appear larger, ie the separation between increments increases. If the pixel distance between adjacent scale marks is within the current min/max thresholds, the basic time unit will not change hence no relabeling is required. For example, in FIG. 18, the time scale has shrunk but is still using the same time unit of 2 hours. If the pixel distance of the time scale unit has become too large and exceeded a threshold limit, the display changes the separation between increments back to a default separation, a new time scale unit interval must be used and the labels will have to be regenerated, see FIG. 19 where the time scale unit has increased from 2 hours to 1 hours and the new labels are used.

In exemplary embodiments, user input with two fingers is not restricted to 'zoom' action. Imagine if the user moves both fingers in the positive x-direction, but one is moving faster than the other, it will result in both 'scroll' and 'zoom'. Under any circumstances, the points of contact under the two fingers will respectively track the motion of the touching finger.

For example, if the two fingers started on 10:15 and 11:30 respectively, when the two fingers are moving in either the same, opposite, or in any direction, the scale 10:15 will always 'stick' to the first finger and the scale 11:30 to the second until released.

Figure 20:
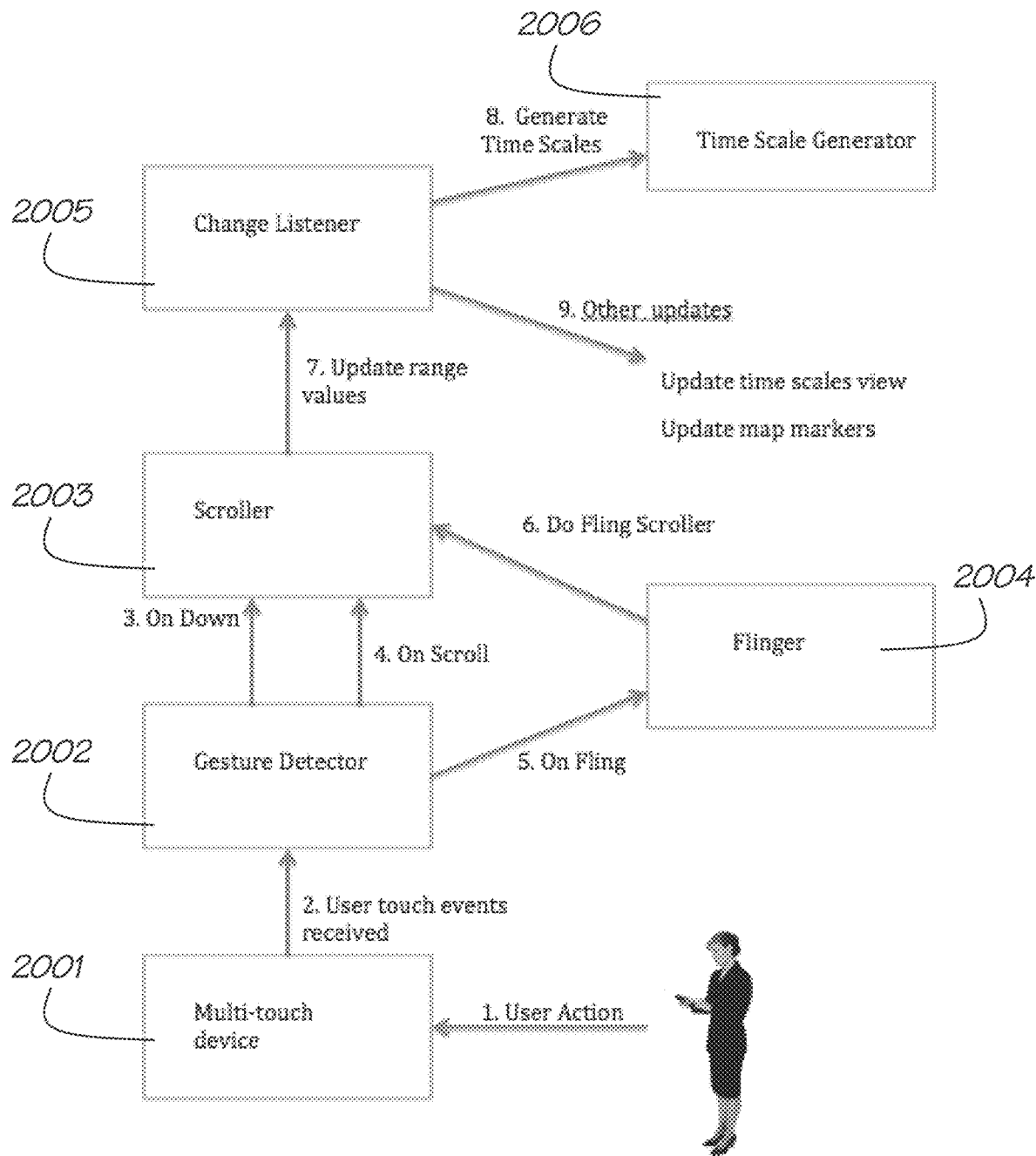
FIG. 20 is a diagram showing different user interactions with the time period controller of FIG. 10.

FIG. 20 provides an explanatory interaction diagram outlining the typical user workflow of the system disclosed herein:

1. User Action

User picks up a touch screen device 2001 and updates the Time Period controller.

2. User Touch Events Received

The multi-touch device hardware and driver generates a sequence of touch events and passes them to the Gesture Detector software module 2002.

3. On Down

If the event is a touch down event, call the Scroller 2003 to stop the fling action if it is still in progress 4. On Scroll If the event is a scroll event, call the Scroller 2003 to update the new position. This also takes into account any changes in the zoom factor.

5. On Fling

If the event is a fling event, call the Flinger module 2004 so that it will interact with the Scroller 2003 to simulate the effect of flinging.

6. Do Fling Scroller

The Flinger 2004 calls the Scroller 2003 to simulate the effect of flinging the Scroller 2003, so that the initial scrolling velocity is decelerated to a standstill after a period calculated according to the law of physics. A Fling can be seen as consists of many intermediate scroll events, where each event may invoke the Change Listener 2005, or only invoke upon the last event if so configured.

7. Update Range Values

The Scroller 2003 calls the Change Listener module 2005 when it detects a change in the time range due to a scroll or zoom action. It also stops any fling action in progress if it senses a press down event.

8. Generate Time Scale

If a change is detected, the change listener will call the Time Scale Generator module 2006 to generate a new list of time scales to populate the new time range. The generated time scales will have the following attributes:

a. Position

The horizontal position in screen pixel coordinate b. Scale Style

The scale is SMALL, MEDIUM or LARGE c. Label Style

The label style which is one of MINOR, MAJOR, or SUPER d. Label

The actual textual label of the scale

9. Other Updates

The Change Listener 2005 also calls the drawing routine to display the generated scales, as well as calling other parts of the program affected by the change.

The following is an exemplary example of rules and algorithm employed in the time period controller:

Rule Set Up

```
Class TimeScaleGenerationRule {
    timeScaleInterval;   // time scale interval in milliseconds for
                         // DEFAULT_PIXELS (currently set to 30)
                         // this Is used for identifying whether this rule is
                         // applicable to current time range
    calendarUnit;        // calendar unit like MINUTE, HOUR, DAY ,,etc
    multiple;            // number of calendar units to form a time scale
                         // interval
    labelFormat;         // label format for minor, major, and super format
                         // eg. "HH:mm" for 12:00 and "dd MMM yy" for
                         // 16 Aprl 15
    enclosingUnit;       // The next higher calendar unit that encloses
                         // the current calendar unit. For example if the
                         // current calendar unit is MINUTE, then this is set
                         // to HOUR.
    labelFormatRules;    // This determines the intervals and height of the
                         // scale mark to use. It also specifies the
                         // intervals a label is to be shown using the format
                         // described in the 'labelFormat' member.
                         // This method generates the time scale based on the local
rules and
                         // the given time window
    List<TimeScale>      generateTimeScale(int screenWidthPixels, int startTimeMillis,
int endTimeMillis);
}
                         // Each instance of TimeScale represents a scale mark which
                         may or may not
                         // have a label shown.
    class TimeScale {
                         // The x - coordinate of the label's position in pixels
        pixelPosition;
                         // The height of the scale marking, which is one of SMALL,
                         MEDIUM
                         // or LARGE
        scaleHeight;
                         // The label (if any) to draw above the scale
        scaleLabel;
    }
```

A list of rule objects sorted by timeScaleInterval in ascending order is created prior to starting the algorithm.

The Algorithm

```
List<TimeScale>
generateTimeScale(int screenWidthPixels,
    int startTimeMillis,
    int endTimeMillis) {
    // Calculate the actual time width represented by
    DEFAULT_PIXELS
    timeWidth = (startTimeMillis – endTimeMillis) *
        DEAULT_PIXELS / screenWidthPixels;
    // Iterate through the list of rule objects to find the rule that is
    // applicable to the current timeWidth
    TimeScaleGenerationRule genRule = findRule(timeWidth);
    List<TimeScale> list = genRule.generate
        TimeScale(screenWidthPixels, startTimeMillis,
        endTimeMillis);
    return list;
}
TimeScaleGenerationRule findRule(int timeWidth) {
    // Iterate through a pre-constructed list of rule objects 'ruleArray'
    which is sorted by the 'timeScaleInterval'
    // field in ascending order
    for each (TimeScaleGenerationRule r : ruleArray) {
        if (timeWidth >= r.timeScaleInterval)
            break;
    }
    // The rule for the current selected time period is now in r
P11 return r;
}

List<TimeScale>
TimeScaleGenerationRule.generateTimeScale(
    Int screenWidthPixels,
    Int startMillis,
    Int endMillis) {
    // Find the beginning enclosing time just before startMillis, this is
    // before the visible range of values. We need to know this time so
    // that we may decide where to begin iterating through all the nodes.
```

-continued

```
startEnclosing = findEncloseBeginTime(startMillis);
step = calUnitToMillis(calendarUnit) * multiple;
result = new List<TimeScale>;
t = startEnclosing;
while (t < endMillis)
do
   // Look up label format rules in the current object to determine
   // the scale height and label format
   height = labelFormatRules.getLabelHeight(t);
   label = labelFormatRules.getLabel(t);
   pixelPos = screenWidthPixels *
            (t − startMillis) / (endMillist − startMillis);
   // Add the new time scale to the result
   timescale = new TimeScale(pixelPos, height, label);
   result.add(timescale);
   t = t + step;
done
return result;
}
```

An illustrative example of how the time period controller can be employed will now be described. In this application, the time period controller is used with a so-called 4D map. The map display shows an actual geographical area. Icons are rendered onto the map display. Each icon represents a location on the map of an event which is occurring within the selected time period shown on the time period display.

Figure 21:
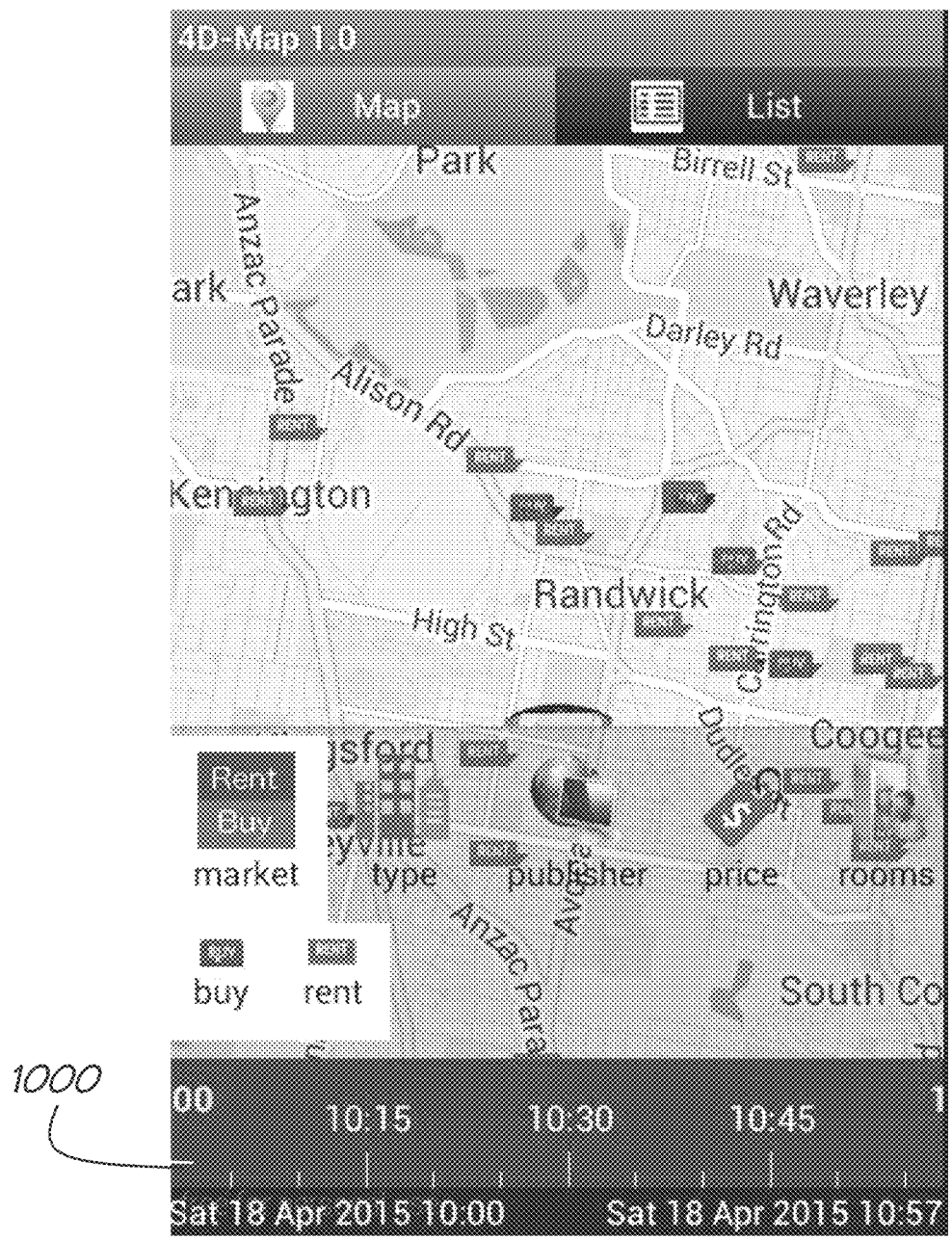
FIGS. 21 to 24 show the time period controller of FIG. 10 employed with a 4D map application following different user input commands.

In FIG. 21, the time range is specified as Sat 18 Apr. 2015 10:00-10:57. The icons shown are open house events whose event time periods overlap with the given time range.

Figure 22:
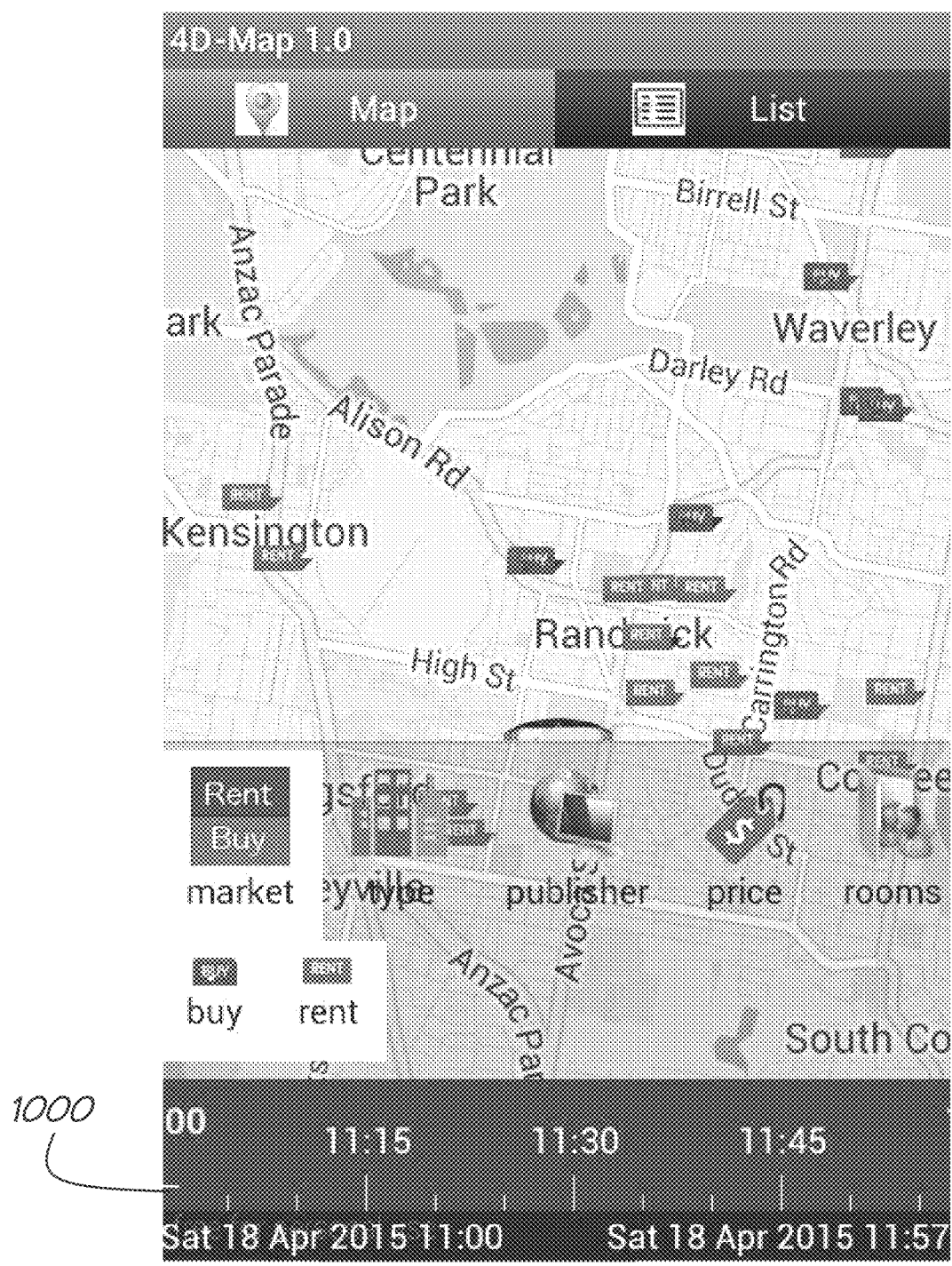

Scrolling the time period controller to later time causes icons to appear and disappear dynamically according to the movement of the time slider 2200, see FIG. 22. The time slider interface 2200 allows pan, zoom, fling. If the user wants to move to a very distant time, say moving to a distant future date (e.g. two years from the present date), it will require a lot of panning of time slider interface 2200 before the desired time is reached. Accordingly, alternate arrangements of the time slider additionally include an time set up dialog, which can be opened with a long tap on the slider interface 2200. This dialog allows the user to jump to a distant time, or set a customizable interval with precision (e.g. configurable to a time resolution of seconds at least) with ease compared to the slider. On the other hand it is also very hard to walk and browse in the time dimension without the slider interface.

Figure 23:
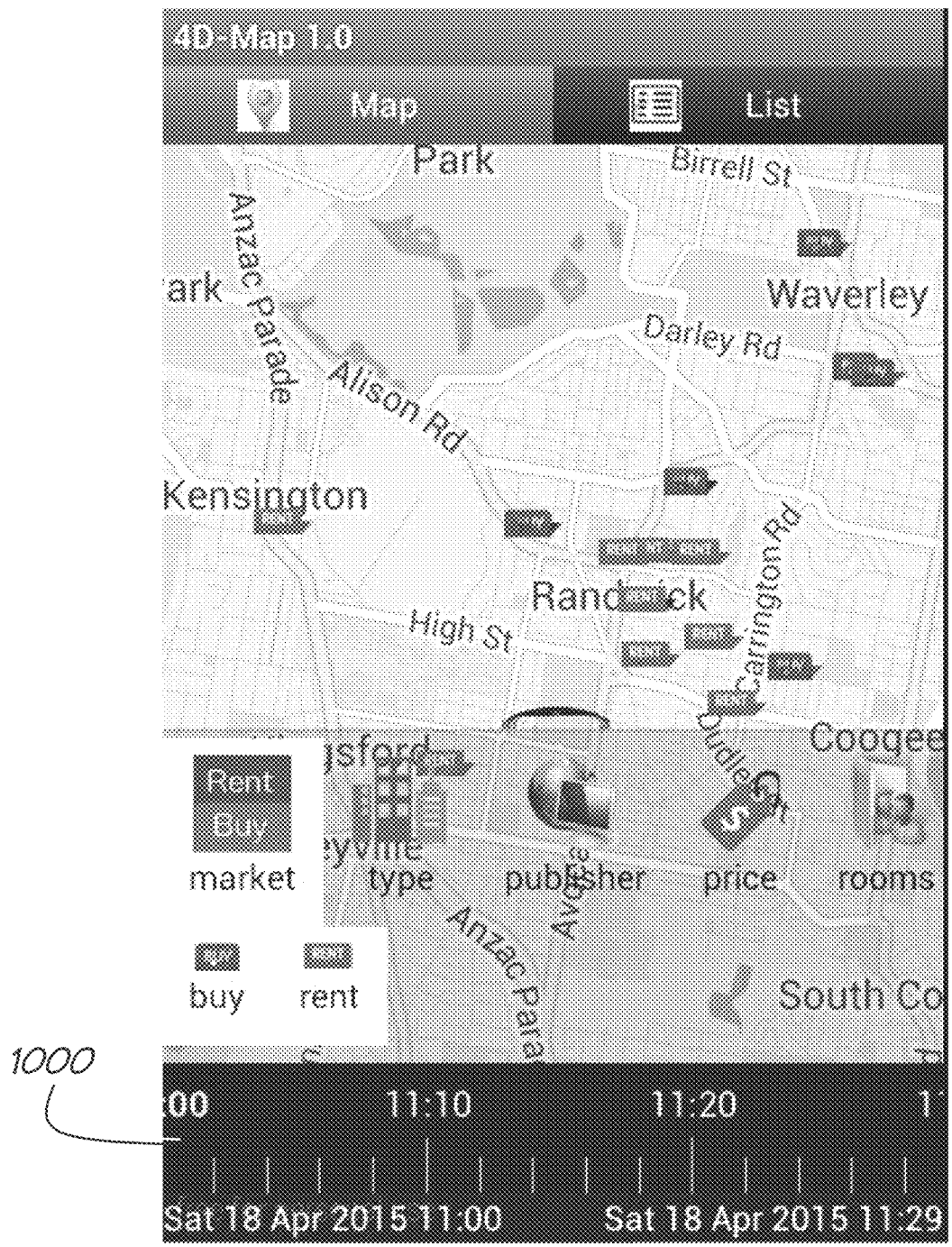

In FIG. 23, following a 'zoom in' input, the time period is now 11:00 to 11:29. As can be seen the number of events has reduced, given that there are less overlaps of events occurring within the reduced time period.

Figure 24:
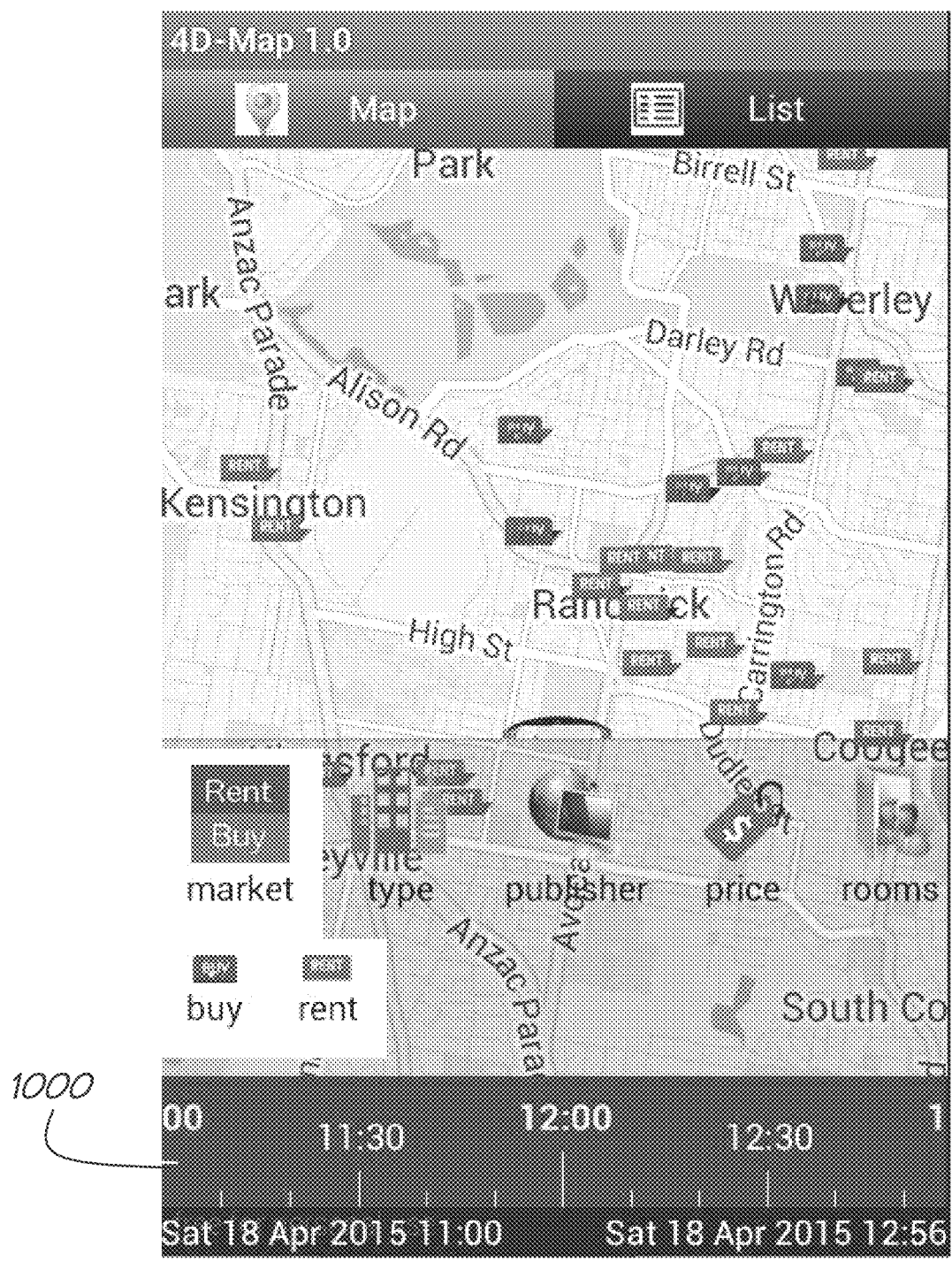

In contrast, in FIG. 24, following a 'zoom out' input, the time period is longer starting from 11:00 to 12:56. This results in more events overlapping with the wider time range and therefore brought into the display.

Interpretation
Bus

In the context of this document, the term "bus" and its derivatives, while being described in a preferred arrangement as being a communication bus subsystem for interconnecting various devices including by way of parallel connectivity such as Industry Standard Architecture (ISA), conventional Peripheral Component Interconnect (PCI) and the like or serial connectivity such as PCI Express (PCIe), Serial Advanced Technology Attachment (Serial ATA) and the like, should be construed broadly herein as any system for communicating data.

In Accordance with:

As described herein, 'in accordance with' may also mean 'as a function of' and is not necessarily limited to the integers specified in relation thereto.

Composite Items

As described herein, 'a computer implemented method' should not necessarily be inferred as being performed by a single computing device such that the steps of the method may be performed by more than one cooperating computing devices.

Similarly objects as used herein such as 'data server', 'server', 'client computing device', 'computer readable medium' and the like should not necessarily be construed as being a single object, and may be implemented as a two or more objects in cooperation, such as, for example, a data server being construed as two or more data servers in a server farm cooperating to achieve a desired goal or a computer readable medium being distributed in a composite manner, such as program code being provided on a compact disk activatable by a license key downloadable from a computer network.

Database:

In the context of this document, the term "database" and its derivatives may be used to describe a single database, a set of databases, a system of databases or the like. The system of databases may comprise a set of databases wherein the set of databases may be stored on a single implementation or span across multiple implementations. The term "database" is also not limited to refer to a certain database format rather may refer to any database format. For example, database formats may include MySQL, MySQLi, XML or the like.

Wireless:

The invention may be embodied using devices conforming to other network standards and for other applications, including, for example other WLAN standards and other wireless standards. Applications that can be accommodated include IEEE 802.11 wireless LANs and links, and wireless Ethernet, or cellular network (e.g. a 3G or 4G telecommunications network).

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some arrangements they might not. In the context of this document, the term "wired" and its derivatives may be used to describe circuits, devices, systems, methods, techniques, communications channels, etc., that may communicate data through the use of modulated electromagnetic radiation through a solid medium. The term does not imply that the associated devices are coupled by electrically conductive wires.

Processes:

Unless specifically stated otherwise, as apparent from the following discussions, it is appreciated that throughout the specification discussions utilizing terms such as "processing", "computing", "calculating", "determining", "analysing" or the like, refer to the action and/or processes of a computer or computing system, or similar electronic computing device, that manipulate and/or transform data represented as physical, such as electronic, quantities into other data similarly represented as physical quantities.

Processor:

In a similar manner, the term "processor" may refer to any device or portion of a device that processes electronic data, e.g., from registers and/or memory to transform that electronic data into other electronic data that, e.g., may be stored in registers and/or memory. A "computer" or a "computing device" or a "computing machine" or a "computing platform" may include one or more processors.

The methodologies described herein are, in one arrangement, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. The processing system further may include a memory subsystem including main RAM and/or a static RAM, and/or ROM.

Computer-Readable Medium:

Furthermore, a computer-readable carrier medium may form, or be included in a computer program product. A computer program product can be stored on a computer usable carrier medium, the computer program product comprising a computer readable program means for causing a processor to perform a method as described herein.

Networked or Multiple Processors:

In alternative arrangements, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Additional Embodiments

Thus, one arrangement of each of the methods described herein is in the form of a computer-readable carrier medium carrying a set of instructions, e.g., a computer program that are for execution on one or more processors. Thus, as will be appreciated by those skilled in the art, arrangements of the present invention may be embodied as a method, an apparatus such as a special purpose apparatus, an apparatus such as a data processing system, or a computer-readable carrier medium. The computer-readable carrier medium carries computer readable code including a set of instructions that when executed on one or more processors cause a processor or processors to implement a method. Accordingly, aspects of the present invention may take the form of a method, an entirely hardware arrangement, an entirely software arrangement or an arrangement combining software and hardware aspects. Furthermore, the present invention may take the form of carrier medium (e.g., a computer program product on a computer-readable storage medium) carrying computer-readable program code embodied in the medium.

Carrier Medium:

The software may further be transmitted or received over a network via a network interface device. While the carrier medium is shown in an example arrangement to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media.

Implementation:

It will be understood that the steps of methods discussed are performed in one arrangement by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Means for Carrying Out a Method or Function

Furthermore, some of the arrangements are described herein as a method or combination of elements of a method that can be implemented by a processor of a processor device, computer system, or by other means of carrying out the function. Thus, a processor with the necessary instructions for carrying out such a method or element of a method forms a means for carrying out the method or element of a method. Furthermore, an element described herein of an apparatus arrangement is an example of a means for carrying out the function performed by the element for the purpose of carrying out the invention.

Connected

Similarly, it is to be noticed that the term connected, when used in the claims, should not be interpreted as being limitative to direct connections only. Thus, the scope of the expression a device A connected to a device B should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

Embodiments

Reference throughout this specification to "one arrangement" or "an arrangement" means that a particular feature, structure or characteristic described in connection with the arrangement is included in at least one arrangement of the present invention. Thus, appearances of the phrases "in one arrangement" or "in an arrangement" in various places throughout this specification are not necessarily all referring to the same arrangement, but may. Furthermore, the particular features, structures or characteristics may be combined in any suitable manner, as would be apparent to one of ordinary skill in the art from this disclosure, in one or more arrangements.

Similarly it should be appreciated that in the above description of example arrangements of the invention, various features of the invention are sometimes grouped together in a single arrangement, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed arrangement. Thus, the claims following the Detailed Description of Specific Embodiments are hereby expressly incorporated into this Detailed Description of Specific Embodiments, with each claim standing on its own as a separate arrangement of this invention.

Furthermore, while some arrangements described herein include some but not other features included in other arrangements, combinations of features of different arrangements are meant to be within the scope of the invention, and form different arrangements, as would be understood by those in the art. For example, in the following claims, any of the claimed arrangements can be used in any combination.

Specific Details

In the description provided herein, numerous specific details are set forth. However, it is understood that arrangements of the invention may be practiced without these specific details. In other instances, well-known methods, structures and techniques have not been shown in detail in order not to obscure an understanding of this description.

Terminology

In describing the preferred arrangement of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various arrangements of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred arrangements of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

What is claimed is:

1. A computer implemented method for providing a controllable time period display, the method comprising:
    displaying a time period on a graphical user interface, the time period is displayed in the form of a visual scale having evenly separated increments displayed from a first end of the display to an opposite second end of the display, wherein the first end of the display represents a start time for the time period and the second end of the display represents an end time for the time period, the start time and end time defining a duration of the displayed time period, wherein at least some of the increments are labelled with an associated respective time within the displayed time period;
    receiving and determining a user input to change the time period;
    displaying the changed time period in accordance with the determined user input;
    wherein, if the determined user input is to change the start time for the time period without changing the duration of the time period, displaying the increments moving towards or away from the first end of the display while maintaining the even separation of the increments while moving;
    wherein, if the determined user input is to change the duration of the displayed time period, displaying the increments as either separating or moving towards each other; wherein the increments are displayed as either separating or moving towards each other until the displayed separation between adjacent increments reaches either a predetermined maximum or minimum threshold, wherein, upon reaching either the predetermined maximum or minimum threshold, the display of increments is changed to a default separation between adjacent increments and least some of the increments are relabeled with an associated respective time within the adjusted displayed time period.

2. The computer implemented method as claimed in claim 1, wherein the graphical user interface is a touchscreen device.

3. The computer implemented method as claimed in claim 2, wherein, if the received user input is the movement of at least one finger across the touchscreen, the user input is determined to be to change the start time for the time period without changing the duration of the time period; wherein the direction in which the increments are displayed to be moving corresponds with the direction of the movement of the at least one finger.

4. The computer implemented method as claimed in claim 2, wherein, if the received user input is the movement of two fingers towards or away from each other on the touchscreen, the user input is determined to be to change the duration of the displayed time period; wherein the displayed increments are caused to separate or move towards each other in accordance with the movement of the fingers.

5. The computer implemented method as claimed in claim 1, wherein displayed increments can be either a major or a minor increment; wherein major increments are displayed as larger compared with minor increments.

6. The computer implemented method as claimed in claim 5, wherein only major increments are labelled with an associated respective time within the displayed time period.

* * * * *